United States Patent [19]

Vasenkov et al.

[11] 4,124,890
[45] Nov. 7, 1978

[54] MICROPROCESSOR COMPUTING SYSTEM

[76] Inventors: Alexandr A. Vasenkov, Zelenograd 103460, korpus 3, kv. 34; Valery L. Dshkhunian, K-482, korpus 338-A, kv. 78; Pavel R. Mashevich, K-482, korpus 338-A, kv. 139; Petr V. Nesterov, K-460, korpus 3, kv. 30; Vyacheslav V. Telenkov, K-527, korpus 811, kv. 75; Jury E. Chicherin, 103460, korpus 161, kv. 31; Davlet I. Juditsky, 125475, ulitsa Zelenogradskaya, 25, korpus 1, kv. 106, all of Moscow, U.S.S.R.

[21] Appl. No.: 808,119

[22] Filed: Jun. 20, 1977

[51] Int. Cl.$^2$ .................. G06F 9/16; G06F 15/16
[52] U.S. Cl. .................................................. 364/200
[58] Field of Search ... 364/200 MS File, 900 MS File

[56] References Cited

U.S. PATENT DOCUMENTS 3,984,813   10/1976   Chung .................................. 364/200

Primary Examiner—James D. Thomas
Attorney, Agent, or Firm—Lackenbach, Lilling & Siegel

[57] ABSTRACT

According to the invention, a microprocessor computing system comprises at least one data processing device and at least one group of execution control elements; said group constitutes a control level and includes at least one microprogram control device which is a group of first-order control elements. The data processing device incorporates a microinstruction register for holding microinstruction codes, a microoperation decoder, a general-purpose register unit for holding operands, an arithmetic/logic unit, a temporary result storage register, a result status register, and at least one data exchange unit having a multichannel communication line to provide for data exchange between other sources and destinations. The microprogram control device producing parallel microinstruction codes incorporates at least one input register, a programmable address unit, a microinstruction storage unit, a feedback register, a microinstruction register, and an output driver unit.

Each data processing device and each microprogram control device as well, comprise an internal operating cycle generator to generate clock signals of the internal operating cycle, which are used to control data sequencing in the related device, all said internal operating cycle generators being linked through at least one clock signal bus.

22 Claims, 13 Drawing Figures

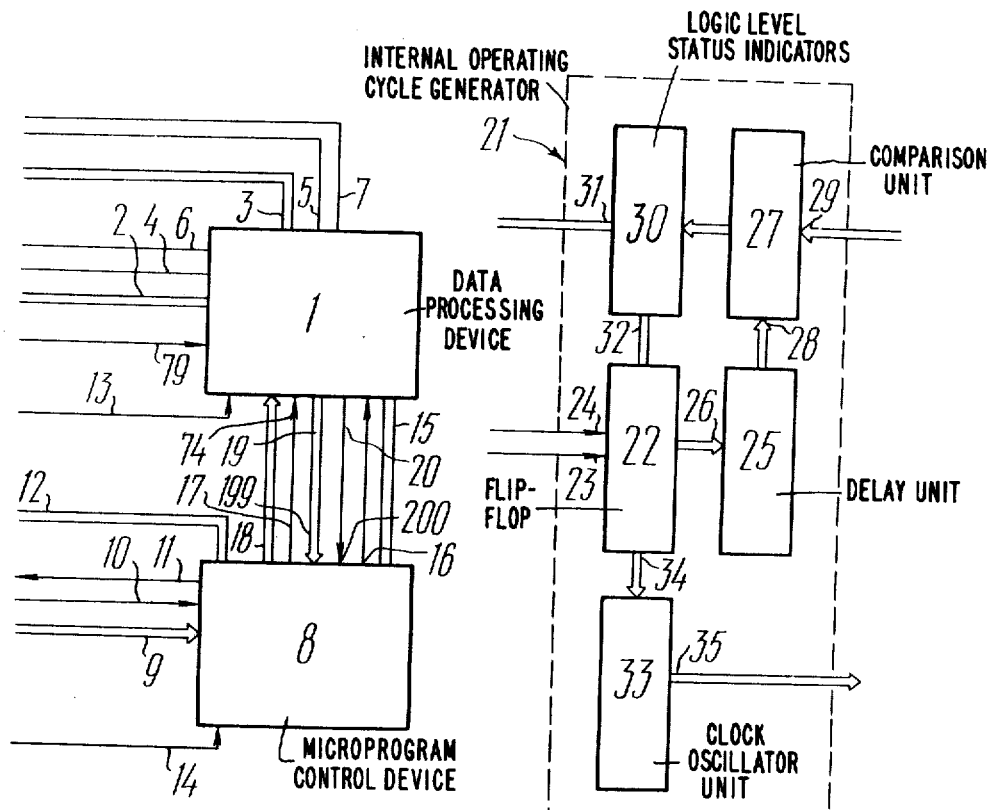

MICROPROCESSOR COMPUTING SYSTEM

FIELD OF THE INVENTION

The present invention relates to computers, and more particularly to microprocessor computing systems. It is applicable to designing of microcomputers and minicomputers.

Microprocessor computing systems are usually built around a limited number of single-chip LSI circuits and perform the function of central processors whose input language contains a certain instruction set.

Depending on their design features and applications the microprocessor computing systems known in the art are divided into two basic groups, as follows:

microprocessor computing systems with fixed control which have no ability to extend the width of coded words and control information processed in parallel, these systems being applicable, in general, to programmable calculators, controllers and other simple computing devices;

microprocessor computing devices with microprogram control in which parallel-processed data and addresses may have their width extended, these systems are suitable for an extensive line of computers which differ in their performance and functional capability and have various instruction sets.

DESCRIPTION OF THE PRIOR ART

In a known microprocessor computing system employing LSI circuits of two types, there is provided at least one data processing device comprising a microinstruction register, a microoperation decoder having its input connected to the output of the microinstruction register, a general-purpose register unit having its input connected to a respective output of the microoperation decoder, an arithmetic/logic unit having its input connected to the output of the general-purpose register unit and having its output connected to a temporary result storage register, a shifter having one input connected to a respective output of the microoperation decoder and having the other input connected to the temporary result storage register, a result status register having one input connected to a respective output of the microoperation decoder and having the other input connected to the output of the shifter, a data exchange unit with a data exchange bus to communicate with other sources and destinations, a result register having an input connected to a respective output of the microoperation decoder, the output of the result register, the other output of the general-purpose register unit and the other output of the result status register being combined and coupled to respective inputs of the arithmetic/logic unit and the data exchange unit, the output of the data exchange unit being combined with the other output of the shifter and coupled to respective inputs of the result register and the general-purpose register unit, a clock signal distributor having its outputs connected to the inputs of all said functional components, at least one microprogram control device comprising an input register with one input accepting instruction codes and the other input connected to the bus of the data exchange unit of the data processing device, a programmable address unit having one input connected to the output of the input register, a microinstruction storage unit whose input is connected to the output of the programmable address unit, a feedback register whose input is connected to the output of the microinstruction storage unit and whose output is connected to the other input of the programmable address unit, a microinstruction register whose input is connected to the other output of the microinstruction storage unit, an output driver unit whose input is connected to the output of the microinstruction register of the microprogram control device and whose output is connected to the input of the microinstruction register of the data processing device, a clock signal distributor whose outputs are connected to respective inputs of all said functional components of the microprogram control device, a clock oscillator whose output is connected to the input of the clock signal distributor of the data processing device and to the input of the clock signal distributor of the microprogram control device, and an interface to external sources and destinations having its outputs connected to the input of the data processing device and to the input of the microprogram control device and having lines for establishing communication with external sources and destinations.

This microprocessor computing system operates as follows. The clock oscillator produces a sequence of clock signals delivered to the clock signal distributor of the data processing device, to the clock signal distributor of the microprogram control device, and to the interface to external sources and destinations. The clock oscillator handles data flow through the system so that operands pass to the data processing device and instructions pass to the microprogram control device. The interface, in turn, produces appropriate service signals delivered to external sources and destinations. The address of a given operand or instruction is generated in the data processing device; according to the signal from a respective signal distributor, the address is conducted to the interface which transfers it to external sources or destinations, for instance, to a main storage. The latter issues an operand or instruction delivered both to the data processing device and to the microprogram control device.

Using clock signals obtained from its clock signal distributor, the microprogram control device generates a sequence of microinstructions passed to the data processing devices. To increase the width of the processing portion of the system, it is necessary to vary the repetition rate of the clock signals produced by the clock oscillator. When shift operations are executed, data processing devices exchange bits using a communication line.

Disadvantages of this microprocessor computing system are as follows:

the data processing devices and the microprogram control device are not flexible, since they operate on-line;

after energizing, the repetition rate of the clock oscillator is adjusted depending on the length of the words being processed and on the data capacity of the microprogoram control devices;

the execution speed is reduced due to sequential passage of carry signals and the system speed calculated in relation to the longest operation is reduced, on the whole, when a sequence of operations of different types is executed; and a complete microprocessor computing system requires some ancillary means to realize data exchange control units and interface logic.

SUMMARY OF THE INVENTION

It is an object of the present invention to provide a microprocessor computing system featuring different structures and capabilities by making its data processing device and its microprogram control device operate off-line.

In accordance with the invention, there is provided a microprocessor computing system wherein each data processing device and each microprogram control device incorporate an internal operating cycle generator producing clock signals for the internal operating cycle to control data sequencing in the device, all internal operating cycle generators being interconnected using a clock signal bus.

It is advisable that each internal operating cycle generator should comprise a multistable flip-flop configuration incorporating a trigger input and an output generating a signal that places the device in a state preceding the beginning of execution of a given instruction sequence, a delay unit whose multichannel input is connected to the multichannel output of the multistable flip-flop configuration, a comparison unit, for comparing the delayed signals of the multistable flip-flop configuration with the end of operation step signals, having one multichannel input connected to the multichannel output of the delay unit and having another multichannel input to supply the end of operation step signals, a logic level status indicator to place indications on a respective clock signal bus, having lines to communicate with that bus and with the multistable flip-flop configuration and having its multichannel input connected to the multichannel output of the comparison unit, a clock oscillator unit whose multichannel input is connected to a second multichannel output of the multistable flip-flop configuration and whose multichannel output generates clock signals for the internal operating cycle to control operation sequencing in the device.

Advantageously a microprocessor system according to the invention may be provided with a group of parallel data processing devices which enables bit extension of parallel-processed data, each data processing device being provided with a bit extension unit having one input accepting external signals to display the current state of the data processing device in the system, other inputs connected to respective outputs of the internal operating cycle generator and the microoperation decoder and another input coupled to the result status register, the bit extension units and respective arithmetic/logic units of all data processing devices being series-connected to form a closed loop by coupling two outputs of an arithmetic/logic unit to respective inputs of a bit extension unit, the bit extension unit of each data processing device being provided with an output to transfer a carry signal and a shift signal and with an output to generate a carry follow signal and to receive a shift signal, said outputs being coupled to respective inputs of the arithmetic/logic unit of another data processing device, a carry signal input of the arithmetic/logic unit being coupled to a shift signal input of the shifter, and a carry follow signal input of the arithmetic/logic unit being coupled to a shift signal output of the shifter, an output of the shifter being coupled to a respective input of the bit extension unit having its input connected to the respective input of the shifter, the arithmetic/logic unit being provided with an end of operation signal output connected to a respective input of the internal operating cycle generator, a trigger output of the output driver unit of the microprogram control device being coupled to the combined inputs of the internal operating cycle generators of the data processing devices, all data processing devices of the system being provided with the same number of data exchange units, the multichannel inputs of the microinstruction registers of all said devices being combined.

It is also advisable that each data exchange unit of the data processing device of a microprocessor computing system, according to the invention, should be provided with a control unit whose inputs are connected to respective outputs of the microoperation decoder and to respective outputs of the internal operating cycle generator and whose outputs are connected to respective inputs of the data exchange unit, the control unit being provided with a signal bus to hold data-in enable signals and data-out follow signals and with a signal bus to hold data-in/data-out complete signals, the identical buses of respective control units of all data processing devices being combined to form respective common buses.

Preferably, the microprogram control device of the microprocessor computing system, according to the invention, should be provided with a utility register to hold the condition code for the microprogram control device transition, the input register being provided with a data exchange control unit, a multichannel input of the utility register being coupled to a respective multichannel output of the microinstruction storage unit and outputs of the utility register being coupled to respective inputs of the output driver unit, the internal operating cycle generator, the feedback register, and the control unit, at least one output of the control unit being coupled to the inputs of the input register and the internal operating cycle generator, the control unit being provided with another input to receive an input register data-in initiate signal and with still another input to receive an input register data-in complete signal,, the outputs of the internal operating cycle generator being coupled to respective inputs of the control unit and input register.

Advantageously, the microprocessor computing system, according to the invention, should comprise at least two groups of first-order serial control elements which provide for multilevel execution control, thereby forming sequential control levels, a group of channels that pass instruction codes and belong to the multichannel input of the input register of the microprogram control device of a lower level being connected to the multichannel output of the output driver unit of the microprogram device of a higher level, other groups of channels that pass the result status information and belong to the multichannel inputs of the input registers of the microprogram control devices of all levels being combined to constitute a common input, the trigger output of the output driver unit of the microprogram control device of a higher level being connected to the input register data-in initiate signal input of the control unit of the microprogram control device of a lower level.

It is also advisable that a microprocessor computing system, according to the invention, should comprise at least two groups of first-order parallel control elements to form a group of the second-order control elements which constitutes a control level, the identical multichannel inputs of the input registers, the input register data-in initiate signal inputs of the control units, the input register data-in complete signal inputs of the control units and the multichannel outputs of the output driver units of all parallel microprogram control devices of one level being combined.

Advantageously, microprocessor computing system, according to the invention, should comprise at least two sequential execution control levels provided by serial groups of control elements and at least one control level formed by a group of second-order control elements.

The features described above allow for a better performance of a microprocessor computing system, according to the invention, for flexible extension of its computing power without introduction of additional types of integrated circuits, for faster operation and greater functional capability of its microprogram control device, for simplified procedure of microprogram extension, for increased functional capability of its data processing device, and for an increased number and length of microprograms as well.

Other features and advantages of the invention will appear from the following description of preferred embodiments thereof, taken in conjunction with the accompanying drawings in which:

BRIEF DESCRIPTION OF THE DRAWINGS

FIG. 1 is a block diagram of a microprocessor computing system, according to the invention;

FIG. 2 is a block diagram of an internal operating cycle generator, according to the invention;

DETAILED DESCRIPTION OF THE INVENTION

Figure 3:
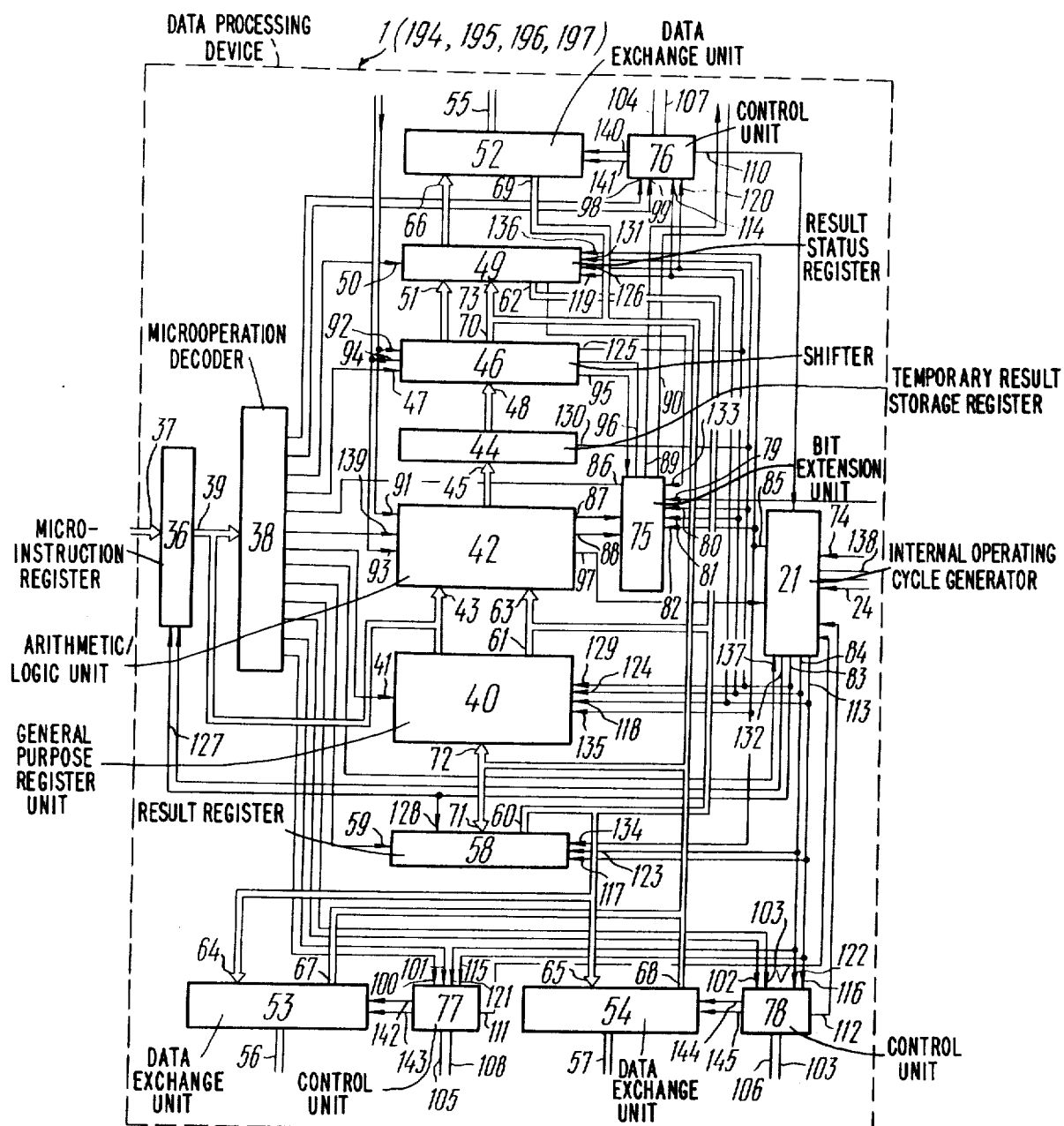
FIG. 3 is a block diagram of a data processing device, according to the invention.

A microprocessor computing system, according to the invention, comprises a data processing device 1 (FIG. 1) which has, in this embodiment, two multichannel communication lines 2 and 3 for data exchange between other sources and destinations not shown in the accompanying drawings (note that duplicate lines are used in the drawings to show multichannel communication lines and buses, multichannel inputs and outputs), two signal buses 4 and 5 holding data-in enable signals and data-out follow signals, and two signal buses 6 and 7 holding data-in data-out complete signals and a microprogram control device 8 incorporating a multichannel input 9 to accept instruction codes, a data-in initiate signal input 10, a data-in complete signal output 11, and a clock signal bus 12. The data processing device 1 and the microprogram control device 8 are provided with respective inputs 13 and 14 to receive signals that place the respective device in a state preceding the beginning of execution of a given instruction sequence and are combined through a clock signal bus 15. A data-in complete signal output 16, a trigger output 17, and a multichannel microinstruction output 18 of the microprogram control device 8 are coupled to respective inputs of the data processing device 1. A multichannel output 19 to provide for data exchange between other sources and destinations and a data-out follow signal output 20 of the data processing device 1 are coupled to respective inputs of the microprogram control device 8.

Each data processing device 1 and each microprogram control device 8 contain an internal operating cycle generator 21 (FIG. 2) which produces clock signals for the internal operating cycle to control data sequencing in a respective device.

The internal operating cycle generator 21 comprises a multistable flip-flop configuration 22 having a trigger input 23 and an input 24 to accept a signal that places the respective device in a state preceding the beginning of a given instruction sequence, a delay unit 25 whose input 26 is coupled to a multichannel output of the multistable flip-flop configuration 22, a comparison unit 27 to compare the delayed signals of the multistable flip-flop configuration 22 with the end of operation step signals, which has one multichannel input 28 coupled to the output of the delay unit 25 and the other multichannel input 29 to a supply of end of operation step signals, a logic level status indicator 30 which provides indications on a respective clock signal bus, is connected to the clock signal bus 12 or 15 through a line 31 and the multistable flip-flop configuration 22 through a line 32 and has its input connected to the multichannel output of the comparison unit 27, a clock oscillator unit 33 having its multichannel input 34 connected to another multichannel output of the multistable flip-flop configuration 22 and having its multichannel output 35 generating clock signals for the internal operating cycle to control the operation sequencing in the microprogram control device 8.

The data processing device 1 (FIG. 1) comprises a microinstruction register 36 (FIG. 3) for holding microinstruction codes provided with a microinstruction input 37; a microoperation decoder 38 having its multichannel input connected to a multichannel output 39 of the microinstruction register 36; a general-purpose register unit 40 for holding operands having an input 41 connected to a respective output of the microoperation decoder 38; and an arithmetic/logic unit 42 whose multichannel input 43 is connected to the output of the general-purpose register unit 40. Also, the data processing device 1 comprises a temporary result storage register 44 having a multichannel input 45 connected to the output of the arithmetic/logic unit 42, a shifter 46 having an input 47 connected to a respective output of the microoperation decoder 38 and having a multichannel input 48 connected to the output of the temporary result storage register 44, and a result status register 49 whose input 50 is coupled to a respective output of the microoperation decoder 38 and whose multichannel input 51 is coupled to an output of the shifter 46.

To provide for data exchange between other sources and destinations, the data processing device 1 has n data exchange units where n may assume any one of the following values: 1, ... i, ... k. In this embodiment, the data processing device 1 comprises three data exchange units 52, 53 and 54.

The data exchange unit 52 (FIG. 3) produces the result status information delivered to the microprogram control device 8 (FIG. 1).

The data exchange units 53 and 54 (FIG. 3) provide a means for data exchange between external sources and destinations which may be a main storage or a read-only storage.

In addition, the data processing device 1 comprises a result register 58 whose input 59 is connected to a respective output of the microoperation decoder 38. A multichannel output 60 of the result register 58, a multichannel output 61 of the general-purpose register unit 40 and a multichannel output 62 of the result status register 49 are combined and connected to a multichannel input 63 of the arithmetic/logic unit 42 and to multichannel inputs 64 and 65 of respective data exchange units 53 and 54. A multichannel input 66 of the data exchange unit 52 is coupled to the output of the result status register 49. Multichannel outputs 67, 68, and 69 of respective data exchange units 52, 54, and 54 and a multichannel output 70 of the shifter 46 are combined and connected to a multichannel input 71 of the result register 58, to a multichannel input 72 of the general-purpose register unit 40, and to a multichannel input 73 of the result status register 49. The output 39 of the microinstruction register 36 is also connected to the input 43 of the arithmetic/logic unit 42. There is a trigger input 74 of the internal operating cycle generator 21 of the data processing device 1 generating clock signals for the internal operating cycle to control data sequencing in the device. The data processing device 1 also comprises a bit extension unit 75 and the data exchange units 52, 53, and 54 are provided with their respective control units 76, 77, and 78.

An input 79 of the bit extension unit 75 accepts external signals to display the current state of the data processing device 1 in the system, whereas inputs 80, 81, and 82 of the bit extension unit 75 are coupled, respectively, to inputs 83, 84, and 85 of the internal operating cycle generator 21, and an input 86 of the bit extension unit 75 is coupled to a respective output of the microoperation decoder 38.

Outputs 87 and 88 of the arithmetic/logic unit 42 are connected to respective inputs of the bit extension unit 75 which is provided with an output 89 to generate carry signals and shift signals and with an output 90 to generate carry follow signals and to receive shift signals. The arithmetic/logic unit 42 has a carry signal input 91 combined with a shift signal input 92 of the shifter 46 and has a carry follow signal input 93 connected with a shift signal output 94 of the shifter 46. An output 95 of the shifter 46 is connected to a respective output of the bit extension unit 75 whose input 96 is connected to a respective output of the shifter 46.

The arithmetic/logic unit 42 has an end of operation signal output 97 connected to a respective input of the internal operating cycle generator 21.

Inputs 98, 99 of the control unit 76, inputs 100, 101 of the control unit 77 and inputs 102, 103 of the control unit 78 are connected to respective outputs of the microoperation decoder 38. Buses 104, 105 and 106 of their respective control units 76, 77 and 78 are used to hold data-in enable signals and data-out follow signals, while buses 107, 108 and 109 hold data-in data-out complete signals. Outputs 110, 111 and 112 of the control units 76, 77 and 78 are coupled to respective inputs of the internal operating cycle generator 21.

An output 113 of the internal operating cycle generator 21 is connected to an input 114 of the control unit 76, to an input 115 of the control unit 77, to an input 116 of the control unit 78, to an input 117 of the result register 58, to an input 118 of the general-purpose register unit 40, and to an input 119 of the result status register 49.

The output 84 of the internal operating cycle generator 21 also connects to an input 120 of the control unit 76, an input 121 of the control unit 77, an input 122 of the control unit 78, an input 123 of the result register 58, an input 124 of the general-purpose register unit 40, the input 81 of the bit extension unit 75, an input 125 of the shifter 46, and an input 126 of the result status register 49.

The output 83 of the internal operating cycle generator 21 connects to an input 127 of the microinstruction register 36, an input 128 of the result register 58, an input 129 of the general-purpose register unit 40, the input 80 of the bit extension unit 75, an input 130 of the temporary result storage register 44, and an input 131 of the result status register 49.

An output 132 of the internal operating cycle generator 21 is coupled to a respective input of the microinstruction register 36.

The output of the result status register 49 is coupled to an input 133 of the bit extension unit 75.

The output 85 of the internal operating cycle generator 21 is connected to the input 134 of the result register 58, to an input 135 of the general-purpose register unit 40, to the input 82 of the bit extension unit 75, and to an input 136 of the result status register 49.

An input 137 of the internal operation cycle generator 21 is coupled to a respective output of the microoperation decoder 38.

The internal operating cycle generator 21 is provided with a clock signal bus 138.

The arithmetic/logic unit 42 is also provided with an input 139 connected to a respective output of the microoperation decoder 38.

Outputs 140 and 141 of the control unit 76 are connected to respective inputs of the data exchange unit 52, outputs 142 and 143 of the control unit 77 are connected to respective inputs of the data exchange unit 53, and outputs 144 and 145 of the control unit 78 are connected to respective inputs of the data exchange unit 54.

The input 13 (FIG. 1) of the data processing device 1 to accept signals that place the device in a state preceding the beginning of execution of a given instruction sequence is connected to the input 24 (FIG. 3) of the internal operating cycle generator 21.

A communication line 56 of the data exchange unit 53 is the multichannel communication line 2 (FIG. 1) of the data processing device 1.

A communication line 57 (FIG. 3) of the data exchange unit 54 is the multichannel communication line 3 (FIG. 1) of the data processing device 1.

The buses 105 and 106 (FIG. 3), that hold data-in enable signals and data-out follow signals, of their respective control units 77 and 78 are the buses 4 and 5 (FIG. 1) of the data processing device 1, while the buses 108 and 109 (FIG. 3) that hold data-in/data-out complete signals are the buses 6 and 7 (FIG. 1) of the data processing device 1.

A communication line 55 (FIG. 3) of the data exchange unit 52 is coupled to the multichannel output 19 (FIG. 1) of the data processing device 1.

The bus 104 (FIG. 3), that holds data-in enable signals and data-out follow signals, of the control unit 76 is connected to the output 20 (FIG. 1) of the data processing device 1.

The bus 107 (FIG. 3) for data-in/data-out complete signals is connected to the input 16 (FIG. 1) of the microprogram control device 8.

A clock signal bus 138 (FIG. 3) of the internal operating cycle generator 21 is coupled to the clock signal bus 15 (FIG. 1).

The trigger input 74 (FIG. 3) of the internal operating cycle generator is the trigger input 23 (FIG. 2) of the multistable flip-flop configuration 22.

The clock signal bus 138 (FIG. 3) is coupled through the line 31 (FIG. 2) to the logic level indicator 30.

The outputs 83, 84, 85, 113 and 132 (FIG. 3) of the internal operating cycle generator 21 form the multichannel output 35 (FIG. 2) of the clock oscillator unit 33.

In the internal operating cycle generator 21 (FIG. 3), the inputs from the control units 76, 77 and 78, and the input from the arithmetic/logic unit 42 as well, are combined to constitute the multichannel input 29 (FIG. 2) of the comparison unit 27.

The microprogram control device 8 (FIG. 1) comprises $n$ input registers where $n$ may assume any one of the following values: $1, \ldots i, \ldots k.$ In this embodiment, the microprogram control device 8 (FIG. 4) producing parallel microinstruction codes comprises an input register 146 having a multichannel input 147, an input register 148 having a multichannel input 149, and a programmable address unit 150 (FIG. 4) having a multichannel input 151 connected to the output of the input register 146 and having a multichannel input 152 connected to the output of the input register 148.

One group of channels of the multichannel inputs 147 and 149 of the input registers 146 and 148 serves to pass instruction codes, while the result status information is routed through another group of channels of said inputs.

In this embodiment, the input register 146 is intended for storing instructions; as a result, the register 146 uses that group of channels of the multichannel input 147 which passes instruction codes, and said group is the input 9 (FIG. 1) of the microprogram control device 8. The input register 148 (FIG. 4) is intended to hold the result status information and uses, therefore, the other group of channels of the multichannel input 149 through which the result status information is routed and which is connected to the multichannel output 19 (FIG. 1) of the data processing device 1.

The multichannel output of the programmable address unit 150 is connected to a multichannel input 153 of a microinstruction storage unit 154 having one multichannel output 155 connected to the multichannel input of a microinstruction register 156, another multichannel output 157 connected to the multichannel input of a utility register 158, and still another multichannel output 159 connected to the multichannel input of a feedback register 160 whose output is connected to another multichannel input 161 of the programmable address unit 150. A multichannel output 162 of the microinstruction register 156 is coupled to the multichannel input of the output driver unit 163 having a multichannel microinstruction output 164 and a trigger output 165.

The internal operating cycle generator 21 incorporated in the microprogram control device 8 has an input 14 to accept signals placing the device in a state preceding the beginning of execution of a given instruction sequence, a clock signal bus 166, and a clock signal bus 167.

The input register 146 is provided with a control unit 168 having an input 169 and an output 170, and the input register 148 is provided with a control unit 171 having an input 172 and an output 173. The inputs 169 and 172 of their respective control units 168 and 171 take data-in initiate signals for the input registers 146 and 148, respectively, while the outputs 170 and 173 generate data-in complete signals for the input registers 146 and 148, respectively.

An output 174 of the internal operating cycle generator 21 is connected to a respective input of the programmable address unit 150 having its output 175 coupled to the input of the microinstruction storage unit 154 whose output 176 is connected to a respective input of the internal operating cycle generator 21.

The utility register 158 has its output 177 coupled to the input of the output driver unit 163, its output 178 coupled to an input 179 of the internal operating cycle generator 21, its output 180 coupled to the input of the feedback register 160, its output 181 coupled to the input of the control unit 171, and its output 182 coupled to the input of the control unit 168. An output of the control unit 168 is coupled to an input 183 of the input register 146 and to an input 184 of the internal operating cycle generator 21, and an output of the control unit 171 is coupled to an input 185 of the input register 148 and to an input 186 of the internal operating cycle generator 21.

An output 187 of the internal operating cycle unit 21 is connected to inputs 188 and 189 of their respective control units 168 and 171, an output 190 is connected to the input of the feedback register 160, an output 191 is connected to the input of the microinstruction register 156, and an output 192 is connected to the input of the utility register 158.

The input 169 (FIG. 4) of the control unit 168 is the input 10 (FIG. 1) of the microprogram control devices, while the output 170 (FIG. 4) is the output 11 (FIG. 1) of the microprogram control device 8.

Figure 4:
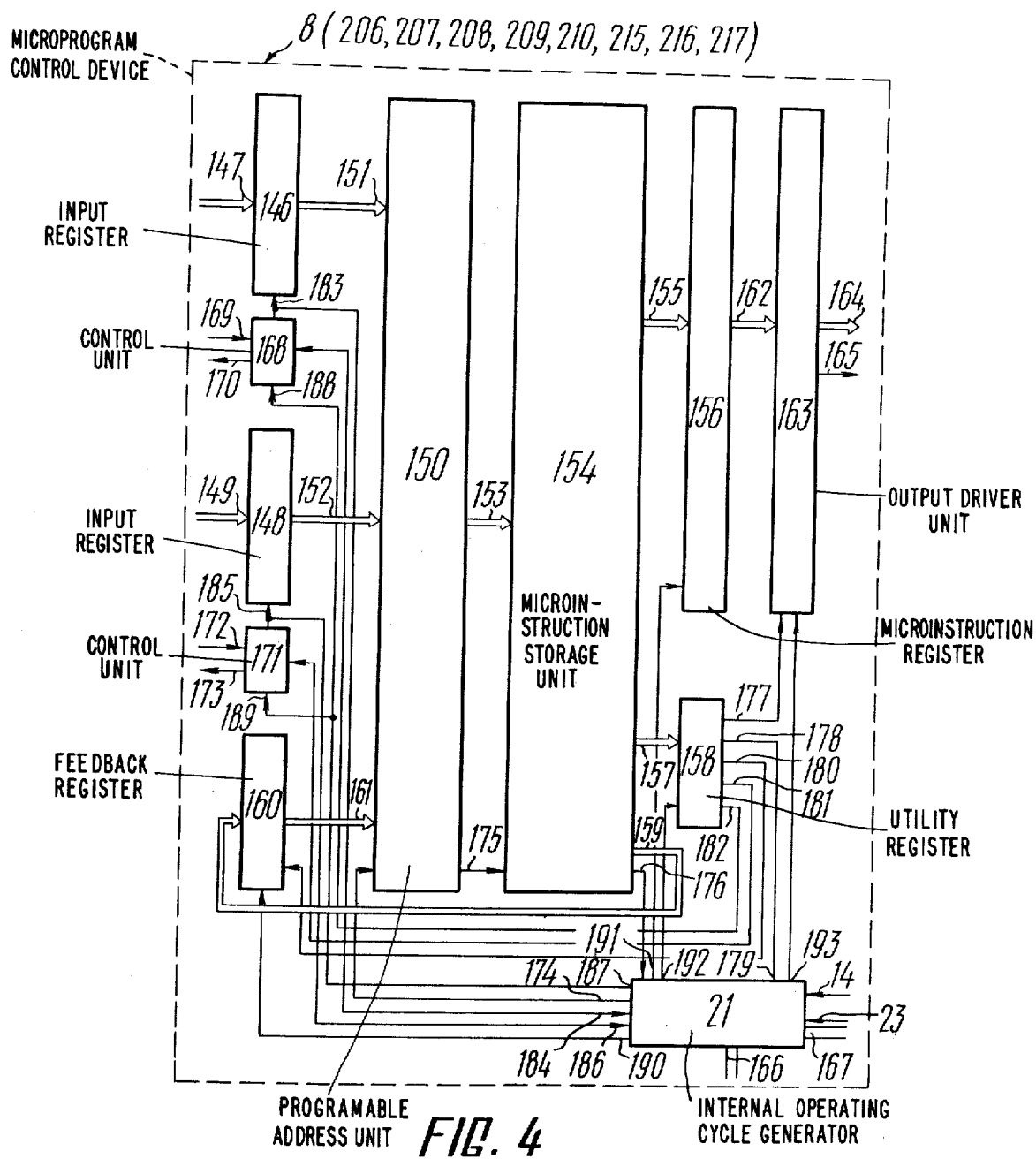
FIG. 4 is a block diagram of a microprogram control device, according to the invention.

The bus 167 FIG. 4) of the internal operating cycle generator 21 is coupled to the clock signal bus 12 (FIG. 1), and the bus 166 (FIG. 4) is coupled to the clock signal bus 15 (FIG. 1).

The output 165 (FIG. 4) of the output driver unit 163 is the output 17 (FIG. 1) of the microprogram control device 8 and is connected to the input 74 (FIG. 3) of the internal operating cycle generator 21.

The multichannel output 164 (FIG. 4) of the output driver unit 163 is the multichannel output 18 (FIG. 1) of the microprogram control device 8 and is coupled to the multichannel input 37 (FIG. 3) of the microinstruction register 36. The output 173 (FIG. 4) of the control unit 171 is the output 16 (FIG. 1) of the microprogram control device 8.

The output 20 of the data processing device 11 is connected to the input 172 (FIG. 4) of the control unit 171.

Figure 5:
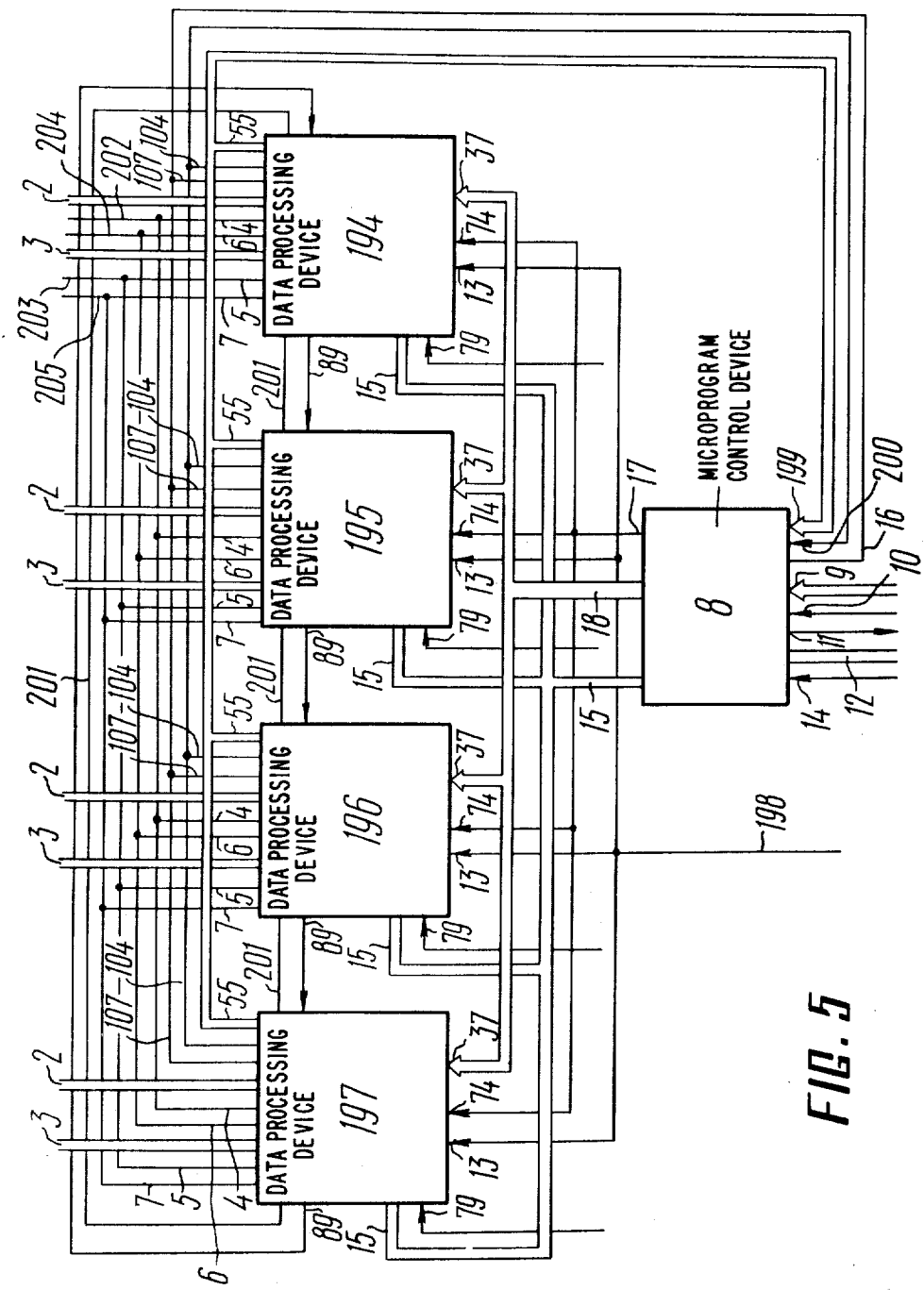
FIG. 5 is a block diagram of a microprocessor computing system comprising data processing devices and a microprogram control device connected in parallel according to the invention.

FIG. 5 is a block diagram of parallel data processing devices providing for bit extension of parallel data and for connection of said devices to the microprogram control device 8. FIG. 5 shows four data processing devices 194, 195, 196, and 197, each being identical to the data processing device 1 shown in FIG. 3; therefore, the identical units of the data processing devices 194-197 bear the same reference numerals as those of the data processing device 1.

The inputs 13 (FIG. 5) of the data processing devices 194-197 are combined to constitute a common input 198 receiving signals placing the data processing devices 194-197 in a state preceding the beginning of execution of a given instruction sequence. The buses 15 are also tied and connected to the microprogram control device 8. The multichannel inputs 37 (FIG. 3) of the microinstruction registers 36 are combined and connected to the multichannel output 18 (FIG. 5) of the microprogram control device 8.

The trigger inputs 74 of the data processing devices 194-197 are combined and connected to the output 17 of the microprogram control device 8. The communication lines 55 (FIG. 3) of the data exchange units 52 of the data processing devices 194-197 (FIG. 5) are combined and connected to a multichannel input 199 of the microprogram control device 8, said input 199 being coupled to that group of channels of the multichannel input 149 (FIG. 4) of the input register 148 which passes the result status information.

The buses 104 (FIG. 3) of the control units 76 are combined and connected to an input 200 (FIG. 5) of the microprogram control device 8. The input 200 is the input 172 (FIG. 4) of the control unit 171.

The output 90 (FIG. 3) of the bit extension unit 75 of the data processing devices 194-197 is connected to the input 93 (FIG. 3) of the arithmetic/logic unit 42 and to the output 94 of the shifter 46 through a connection 201.

The buses 4,5,6,7 of the data processing devices 194-197 are combined to form respective common buses 202, 203, 204, and 205.

The data-in/data-out complete signal buses 107 are combined and connected to the data-in complete signal output 16 (FIG. 1) of the microprogram control device 8. The output 89 (FIG. 3) of the bit extension unit 75 of the data processing devices 194-197 (FIG. 5) is connected to the input 91 (FIG. 3) of the arithmetic/logic unit 42 and to the input 92 of the shifter 46 of the data processing devices 194-197 (FIG. 5).

Figure 6:
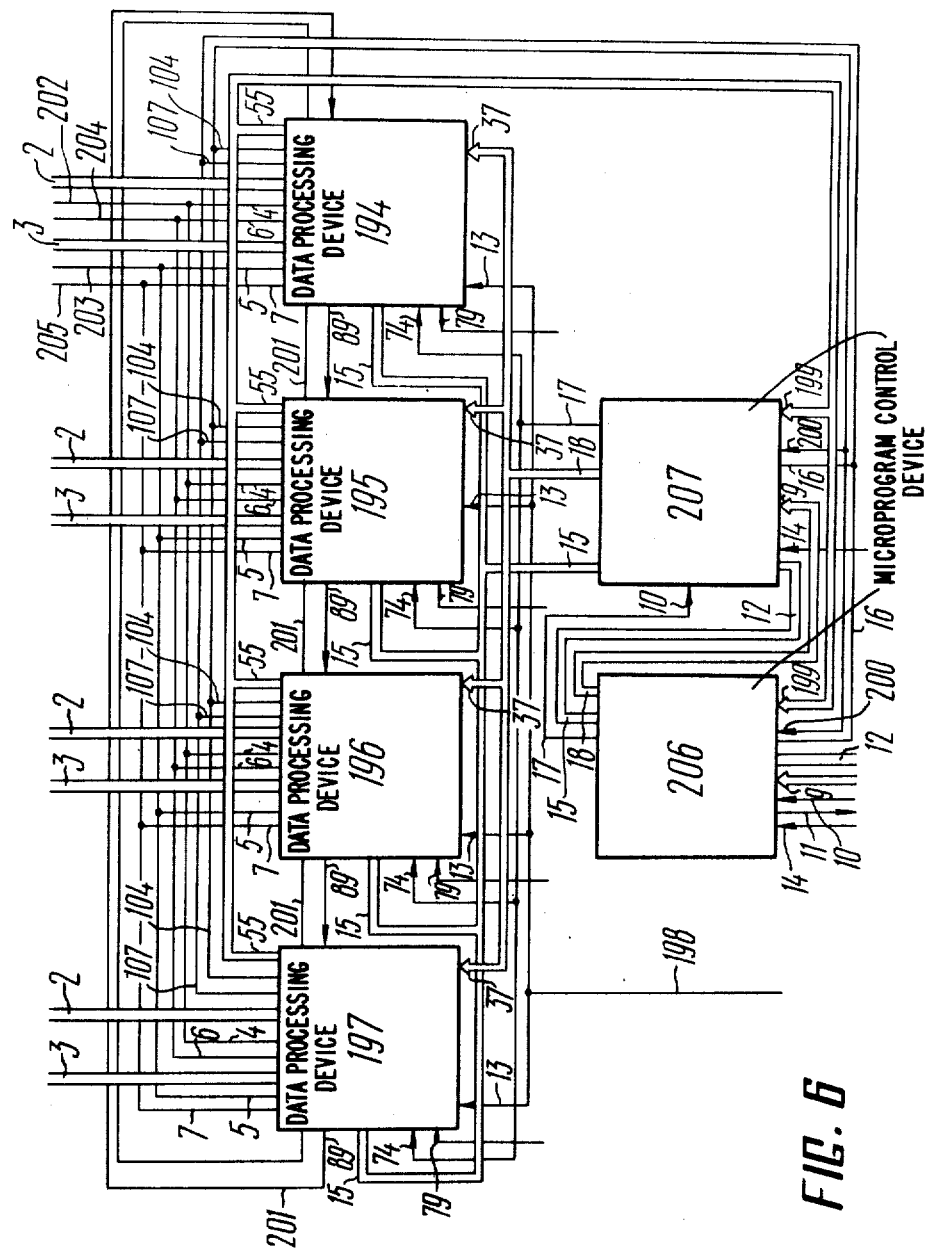
FIG. 6 is a block diagram of a microprocessor computing system comprising parallel data processing devices and serial microprogram control devices, according to the invention.

FIG. 6 is a block diagram of parallel data processing devices 194-197 and serial microprogram control devices 206 and 207 to provide for a two-level execution control configuration.

As compared to the microprogram control device 8 (FIG. 1, FIG. 4), the microprogram control devices 206 and 207 (FIG. 4) are identical in design and operational features; therefore, their units are assigned the same reference numerals as those of similar units of the microprogram control device 8.

The output 17 (FIG. 6) of the micropgoram control device 206 is coupled to the input 10 of the microprogram control device 207. The multichannel output 18 of the microprogram control device 206 is coupled to the multichannel instruction code input 9 of the microprogram control device 207. The clock signal bus 15 of the microprogram control device 206 is coupled to the clock signal bus 12 of the microprogram control device 207. The multichannel inputs 199 of the microprogram control devices 206 and 207 are combined and connected to the combined communication lines 55 of the data processing devices 194-197. The outputs 16 of the data processing devices 194-197 are combined and connected to their combined buses 107. The inputs 200 of the microprogram control devices 206 and 207 are combined and connected to the combined buses 104, that hold data-in enable signals and data-out follow signals, of the data processing devices 194-197.

Figure 7:
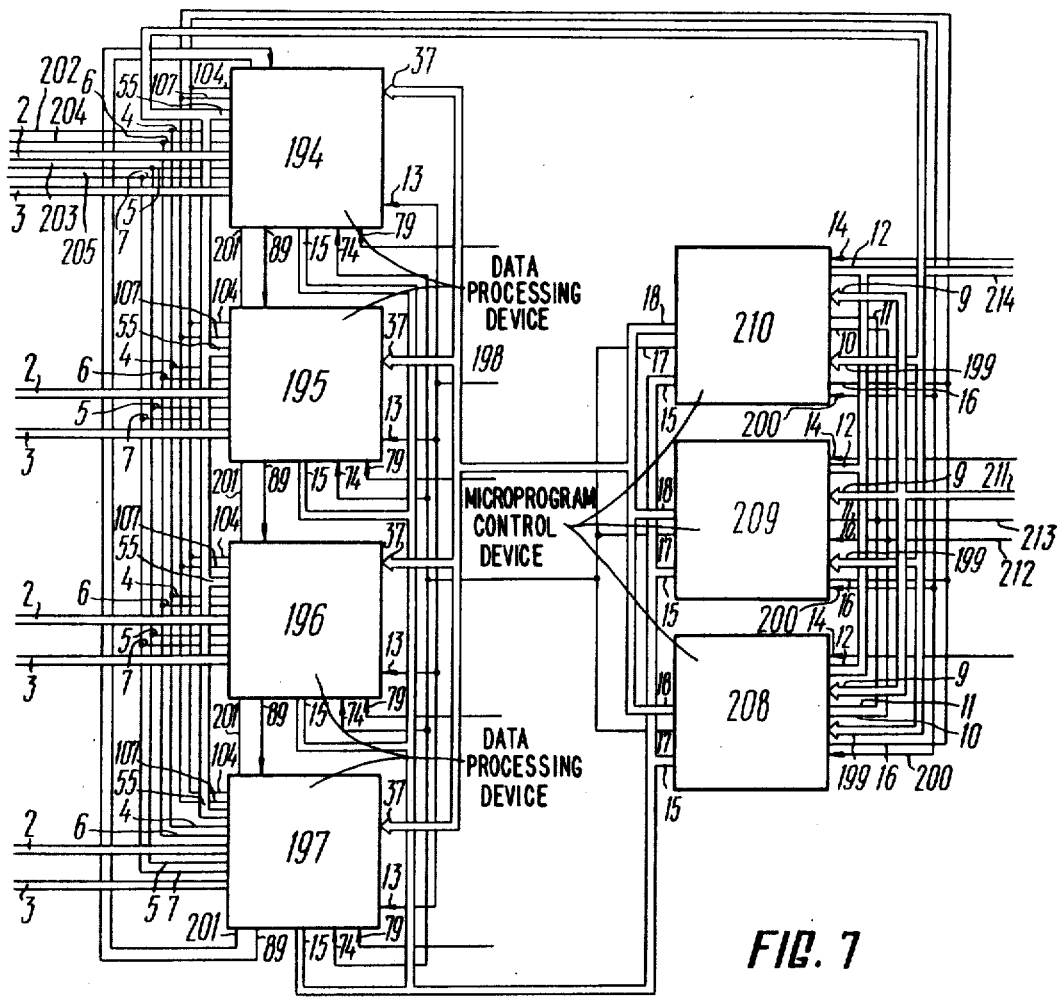
FIG. 7 is a block diagram of a microprocessor computing system comprising parallel data processing devices and parallel microprogram control devices, according to the invention.

FIG. 7 is a block diagram of parallel data processing devices 194-197 and parallel microprogram control devices 208, 209, 210. Since the microprogram control devices 208, 209, 210 are identical to the microprogram control device 8 (FIG. 4), the same reference numerals are employed as in FIGS. 1 and 4. The multichannel inputs 9 (FIG. 7) of the microprogram control devices 208, 209, 210 are combined to form a common multichannel instruction code input 211. The data-in initiate signal inputs 10 of the microprogram control devices 208, 209, 210 are combined to form a common output 212. The data-in complete signal outputs 11 of the microprogram control devices 208, 209, 210 are combined to form a common output 213. The trigger outputs 18 of the microprogram control devices 208, 209, 210 are combined and connected to the combined multichannel microinstruction inputs 37. The multichannel inputs 199 of the microprogram control devices 208, 209, 210 are combined and connected to the combined multichannel communication lines 55 of the data processing devices 194-197. The clock signal buses 12 of the microprogram control devices 208, 209, 210 are combined to form a common clock signal bus 214. The clock signal buses 15 of the data processing devices 194-197 and of the microprogram control devices 208, 209, 210 are combined and connected to the combined buses 104 of the data processing devices 194-197. The outputs 16 of the microprogram control devices 208, 209, 210 are combined and connected to the combined buses 107 of the data processing devices 194-197.

Figure 8:
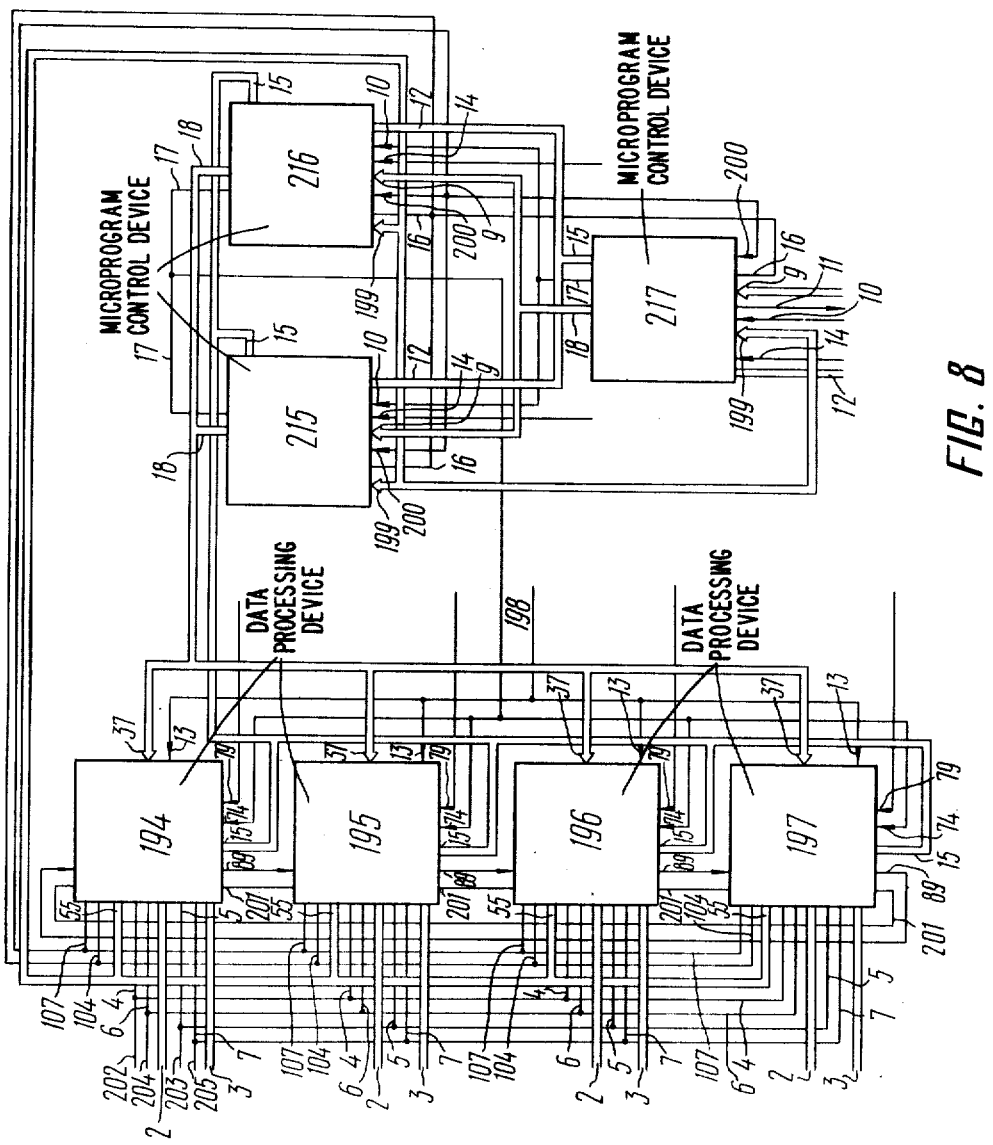
FIG. 8 is a block diagram of a microprocessor computing system comprising parallel data processing devices and parallel/serial microprogram control devices, according to the invention.

FIG. 8 is a block diagram of parallel data processing devices 194-197 and parallel/serial microprogram control devices 215, 216, 217, which provides for storage extension and two-level execution control. Since the microprogram control devices 215, 216, 217 are identical to the microprogram control device 8 (FIGS. 1 and FIG. 4), the same reference numerals are employed as in FIGS. 1 and 4. The multichannel inputs 199 (FIG. 8) of the microprogram control devices 215, 216, 217 are combined and connected to the combined communication lines 55 of the data processing devices 194-197. The multichannel outputs 18 of the microprogram control devices 215, 216 are combined and connected to the combined multichannel inputs 37 of the data processing devices 194-197. The trigger outputs 17 of the microprogram control devices 215, 216 are combined and connected to the combined trigger inputs of the data processing devices 194-197. The clock signal buses 15 of the microprogram control devices 215, 216 are combined with the clock signal buses 15 of the data processing devices 194-197. The clock signal buses 12 of the microprogram control devices 215 and 216 are combined and connected to the clock signal bus 15 of the microprogram control device 217. The inputs 10 of the microprogram control devices 215, 216 are combined and connected to the trigger input 17 of the microprogram control device 217. The multichannel inputs 9 of the microprogram control devices 215, 216 are combined and connected to the multichannel output 18 of the microprogram control device 217. The inputs 200 of the microprogram control devices 215, 216, 217 are combined and connected to the combined buses 107 of the data processing devices 194-197, whereas the outputs 16 of the microprogram control devices 215, 216, 217 are connected to the combined buses 104 of the data processing devices 194-197.

Figure 9:
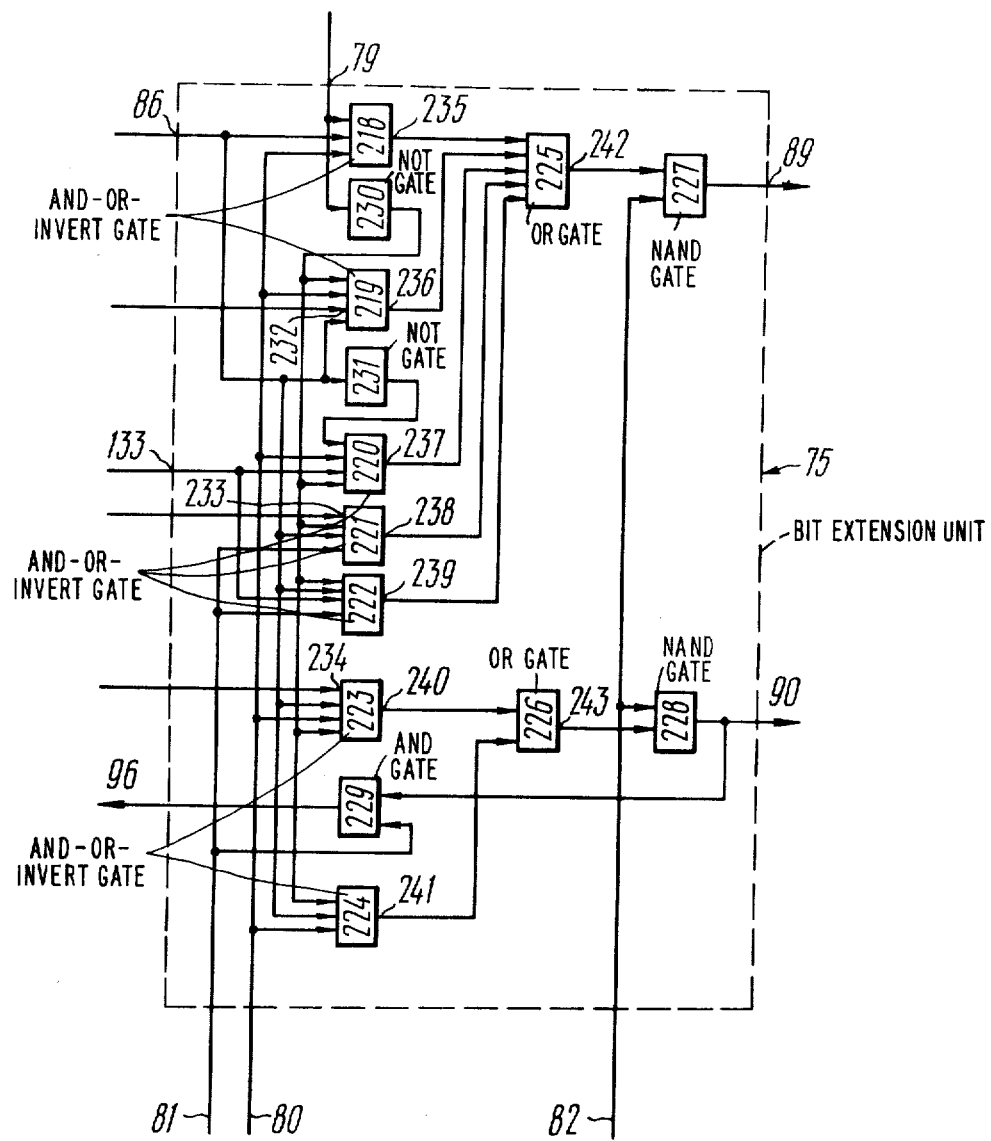
FIG. 9 is a block diagram of a bit extension unit, according to the invention.

The bit extension unit 75 (FIG. 9) comprises AND-OR-Invert gates 218, 219, 220, 221, 222, 223, 224, OR gates 225, 226, NAND gates 227, 228, an AND gate 229, and NOT gates 230, 231.

The input 79 of the bit extension unit 75 is coupled to the AND-OR-Invert gate 218 and to the NOT gate 230. The input 86 of the bit extension unit 75 is connected to the AND-OR-Invert gates 218, 219, 221, 222, 223, 224 and to the NOT gate 231. The input 133 of the bit extension unit 75 is connected to the AND-OR-Invert gates 220, 222. The input 81 is connected to the AND-OR-Invert gates 221, 222 and to the AND gate 229. The input 80 of the bit extension unit 75 is coupled to the AND-OR-Invert gates 218, 219, 220, 223, 224. The input 82 is coupled to the NAND gates 227, 228. The output of the NAND gate 227 is the output 89 of the bit extension unit 75. The AND-OR-Invert gates 219, 221, 223 are provided with additional inputs 232, 233, 234, respectively. Outputs 235, 236, 237, 238, 239 of the AND-OR-Invert gates 218, 219, 220, 221, 222, respectively, are connected to the inputs of the OR gate 225. Outputs 240, 241 of the AND-OR-Invert gates 223, 224 are connected to the inputs of the OR gate 226. An output 242 of the OR gate 225 is connected to the input of the NAND gate 227. An output 243 of the OR gate 226 is connected to the input of the NAND gate 228. The output of the NOT gate 230 is connected to the inputs of the AND-OR-Invert gates 219, 220, 221, 222, 223, 224. The output of the NOT gate 231 is connected to the input of the AND-OR-Invert gate 220. The input of the AND gate 229 is coupled to the output 90 of the NAND gate 228, and the output of the AND gate 229 is the output 96 of the bit extension unit 75.

The input 232 of the AND-OR-Invert gate 219 is coupled to the output 87 (FIG. 3) of the arithmetic/logic unit 42. The input 234 (FIG. 9) of the AND-OR-Invert gate 223 is coupled to the output 88 (FIG. 3) of the arithmetic/logic unit 42. The input 233 (FIG. 9) of the AND-OR-Invert gate 221 is coupled to the output 95 (FIG. 3) of the shifter 46.

Figure 10:
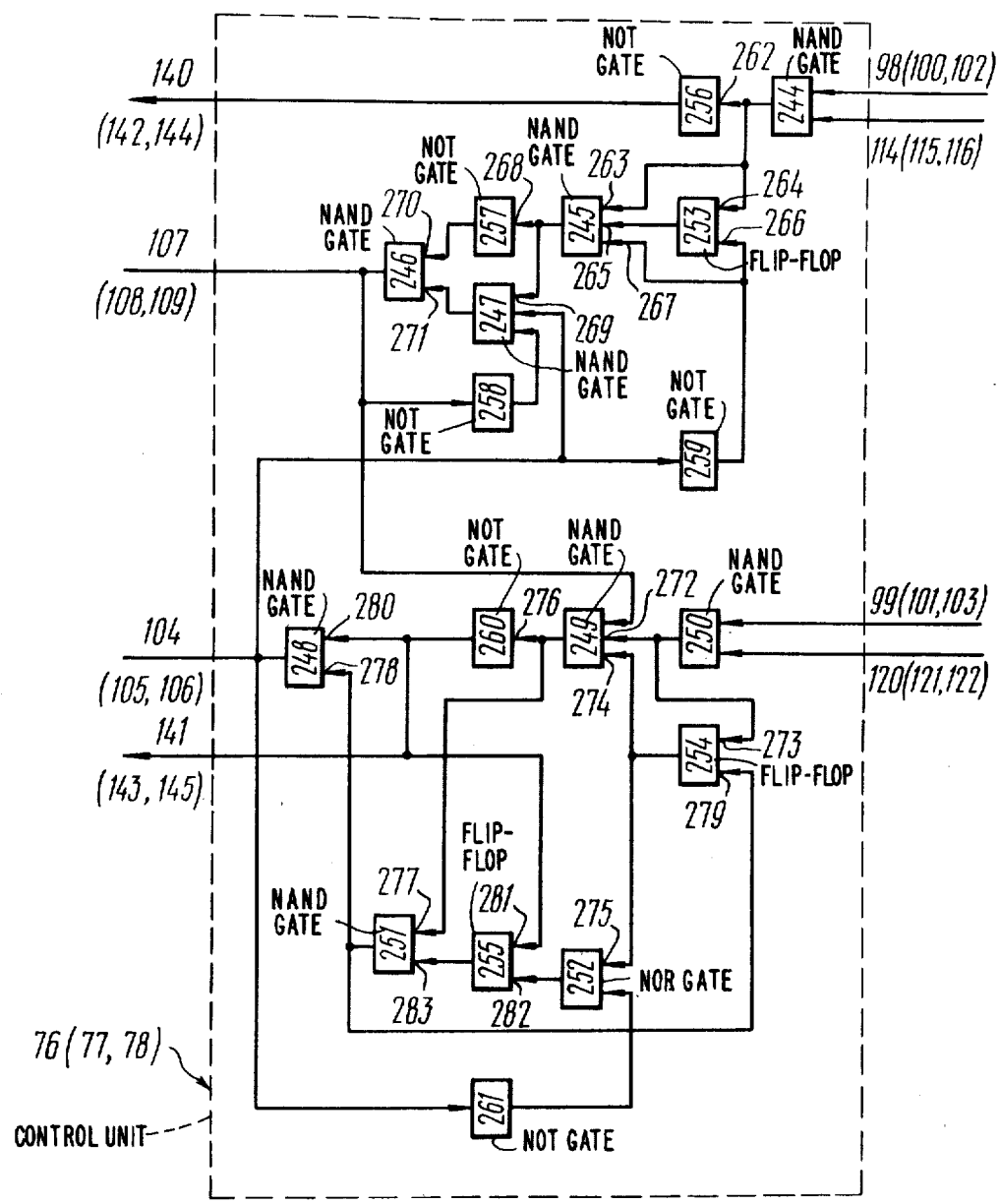
FIG. 10 is a block diagram of a control unit of a data processing device, according to the invention.

FIG. 10 is a block diagram of the control unit 76. Note that the control units 77, 78 are designed identically.

The control unit 76 comprises NAND gates 244, 245, 246, 247, 248, 249, 250, 251, a NOR gate 252, flip-flops 253, 254, 255, and NOT gates 256, 257, 258, 259, 260, 261. The output of the NOT gate 256 is coupled to the output 140. The inputs 98 and 114 of the control unit 76 are connected to the NAND gate 244. The input 99 (101, 103) and the input 120 (122, 121) are coupled to the NAND gate 250. The output of the NAND gate 248 is coupled to the bus 104. The output of the NOT gate 260 is the output 141. The output of the NAND gate 244 is connected to an input 262 of the NOT gate 256, to an input 263 of the NAND gate 245, and to an input 264 of the flip-flop 253. The output of the flip-flop 253 is connected to an input 265 of the NAND gate 245. The output of the NOT gate 259 is connected to inputs 266, 267 of the flip-flop 253 and the NAND gate 245, respectively. The output of the NAND gate 245 is connected to inputs 268, 269 of the NOT gate 257 and the NAND gate 247, respectively. The output of the NOT gate 257 is coupled to an input 270 of the NAND gate 246, and the output of the NAND gate 247 is coupled to an input 271 of the NAND gate 246. The output of the NAND gate 250 is connected to inputs 272, 273 of the NAND gate 249 and the flip flop 254, respectively, and the output of the flip flop 254 is connected to inputs 274, 275 of the NAND gate 249 and the NOT gate 252, respectively. The output of the NAND gate 249 is connected to inputs 276, 277 of the NOT gate 260 and the NAND gate 251, respectively. The output of the NAND gate 251 is coupled to inputs 278, 279 of the NAND gate 248 and the flip-flop 254, respectively. The output of the NOT gate 260 is connected to an input 280 of the NAND gate 248 and to an input 281 of the flip-flop 255. The output of the NOR gate 252 is connected to an input 282 of the flip-flop 255. The output of the flip-flop 255 is connected to an input 283 of the NAND gate 251.

Figure 11:
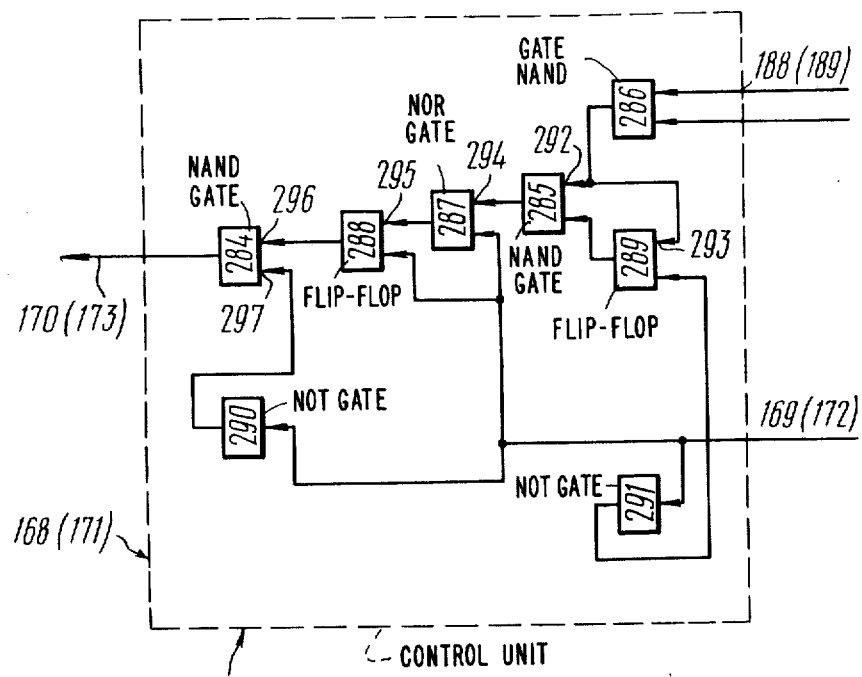
FIG. 11 is a block diagram of a control unit of a microprogram control device, according to the invention.

FIG. 11 is a block diagram of the control unit 168. Note that the control unit 171 (FIG. 4) has a similar design.

The control unit 168 (FIG. 11) comprises NAND gates 284, 285, 286, a NOR gate 287, flip-flops 288, 289, and NOT gates 290, 291. The output of the NAND gate 286 is coupled to an input 292 of the NAND gate 285 and to an input 293 of the flip-flop 289. The output of the NAND gate 285 is coupled to an input 294 of the NOR gate 287. The output of the NOR gate 287 is coupled to an input 295 of the flip-flop 288. The output of the flip-flop 288 is coupled to an input 296 of the NAND gate 284. The output of the NOR gate 290 is coupled to an input 297 of the OR gate 284. The input 169 of the control unit 168 is connected to the NOR gate 290, to the flip-flop 288, to the NOR gate 287, and to the NOT gate 291. The output of the NOT gate 291 is connected to the other input of the flip-flop 289.

Figure 12:
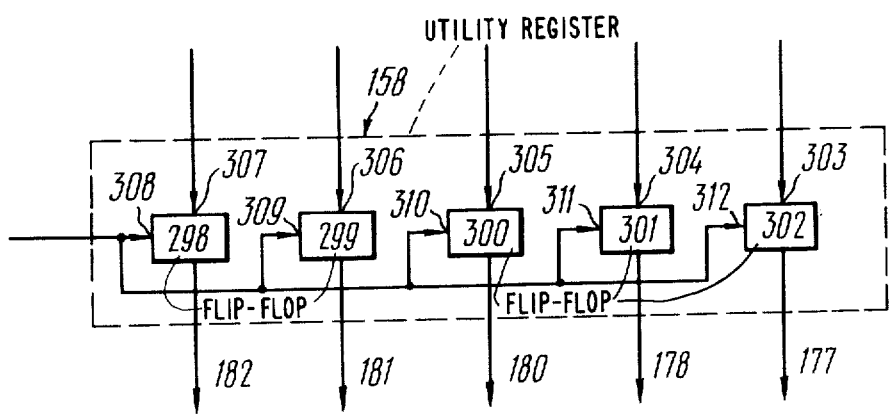
FIG. 12 is a block diagram of a utility register of a microprogram control device, according to the invention.

The utility register 158 (FIG. 12) comprises flip-flops 298, 299, 300, 301, 302 provided with respective outputs 182, 181, 180, 178 and 177.

The multichannel output 157 (FIG. 4) of the microinstruction storage unit 154 is connected to inputs 307, 306, 305, 304 and 303 (FIG. 12) of respective flip-flops 298, 299, 300, 301, 302. The output 192 of the internal operating cycle generator 21 is coupled to inputs 308, 309, 310, 311, 312 (FIG. 12) of respective flip-flops 298, 299, 300, 301, 302.

Figure 13:
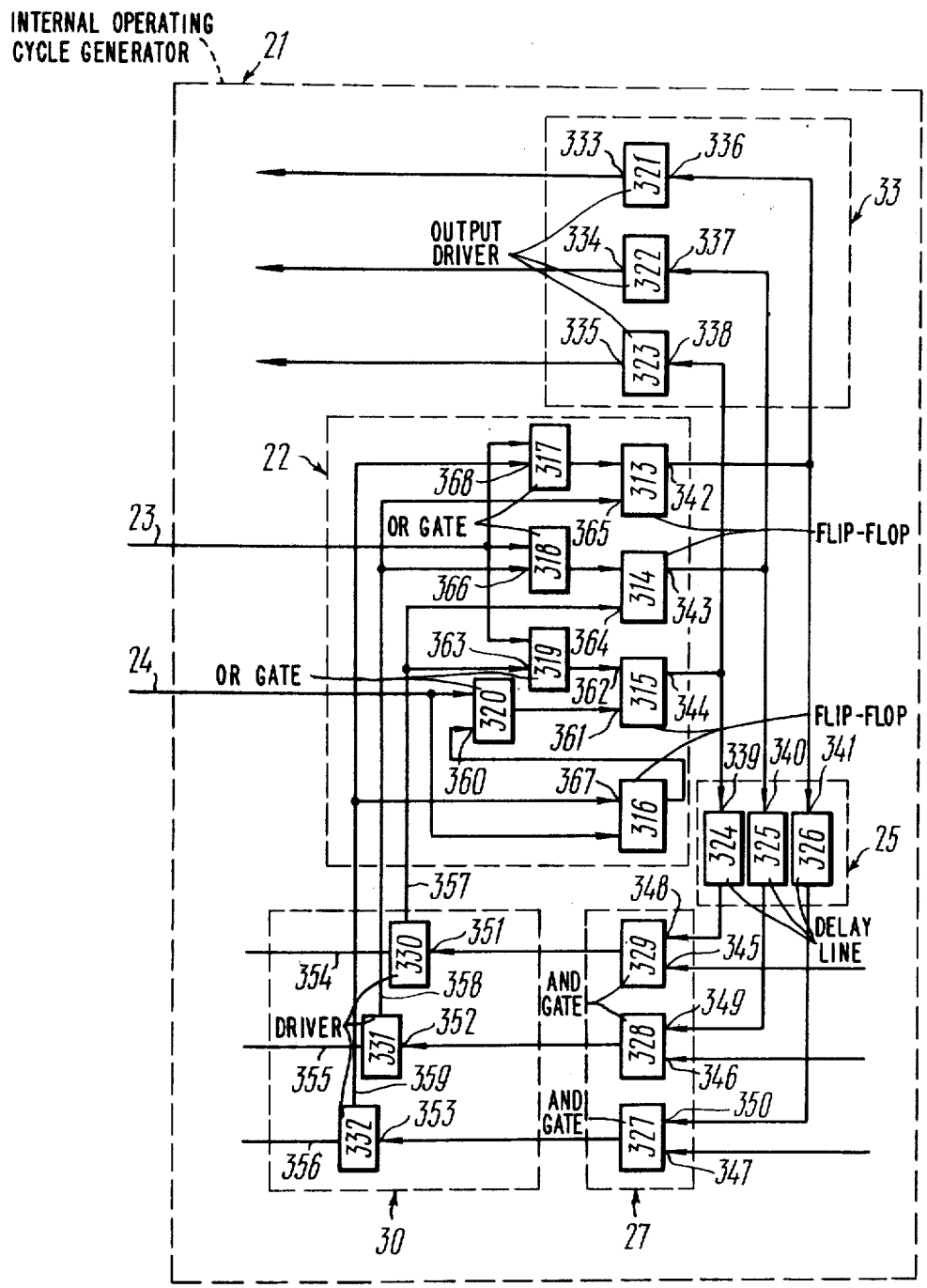
FIG. 13 is a block diagram of an internal operating cycle generator, according to the invention.

The multistable flip-flop configuration 22 (FIG. 13) may comprise $n$ flip-flops. In the under consideration embodiment, the multistable flip-flop configuration 22 comprises flip-flops 313, 314, 315, 316 and OR gates 317, 318, 319, 320. The clock oscillator unit 33 comprises output drivers 321, 322, 323. The delay unit 25 comprises delay lines 324, 325, 326. The comparison unit 27 comprises AND gates 327, 328, 329. The logical level status indicator 30 comprises drivers 330, 331, 332. Outputs 333, 334, 335 of the output drivers 321, 322, 323, respectively, constitute the multichannel output 35 (FIG. 2) of the clock oscillator unit 33. Inputs 336, 337, 338 (FIG. 13) of the output drivers 321, 322, 323, respectively, form the multichannel input of the clock oscillator unit 33 (FIG. 2). Inputs 339, 340, 341 (FIG. 13) of the delay lines 324, 325, 326 provide the multichannel input 26 (FIG. 2) of the delay unit 25. Outputs 342, 343, 344 (FIG. 13) of the flip-flops 313, 314, 315 constitute the multichannel output 34 (FIG. 2) of the multistable flip-flop configuration 22 coupled to the multichannel input of the clock oscillator unit 33 and also constitute another multichannel output connected to the multichannel input 26 of the delay unit 25. Inputs 345, 346, 347 (FIG. 13) of the AND gates 327, 328, 329 form the multichannel input 29 (FIG. 2) of the comparison unit 27. The outputs of the delay lines 324, 325, 326 (FIG. 13) are connected to inputs 348, 349, 350 of the AND gates 327, 328, 329 and form the multichannel input 28 (FIG. 2) of the comparison unit 27. Inputs 351, 352, 353 (FIG. 3) of the drivers 330, 331, 332 form the multichannel input of the logical level status indicator 30 (FIG. 2).

Communication lines 354, 355, 356 provide the line 31 (FIG. 2) of the logical level status indicator 30. Communication lines 357, 358, 359 (FIG. 13) of the drivers 330, 331, 332 provide the line 32 (FIG. 2). The output of the flip-flop 316 (FIG. 13) is coupled to an input 360 of the OR gate 320 whose output is connected to an input 361 of the flip-flop 315. The output of the OR gate 319 is coupled to an input 362 of the flip-flop 315. The output 357 of the driver 330 is connected to an input 363 of the OR gate 319 and to an input 364 of the flip-flop 314. The output 358 of the driver 331 is coupled to an input 365 of the flip-flop 313 and to an input 366 of the OR gate 318. The output 359 of the driver 332 is coupled to an input 367 of the flip-flop 316 and to an input 368 of the OR gate 317.

A microprocessor computing system, according to the invention, handles digital data as follows. The input 14 (FIG. 1) of the microprogram control device 8 accepts a signal that places said device in a state preceding the beginning of execution of a given instruction sequence. The microprogram control device 8 places, on the clock signal bus 12, a signal that enables control information to be read from an external source, say, a main storage (not shown). An instruction code is directed to the input register 146 (FIG. 4) via the multichannel input 9 of the microprogram control device 8. The input 10 (FIG. 1) accepts a signal indicating that the instruction code is accepted by the multichannel input 9. The microprogram control device 8 places on the output 11 a signal that acknowledges that the instruction code is set in the input register 146 (FIG. 4). Following that signal, the main storage is turned off. If the control unit 168 (FIG. 4) is not present in the microprogram control device 8 (FIG. 1), then said signals pass over the clock signal bus 12. The microprogram control device 8 operates to pass a microinstruction through the multichannel output 18 and places a trigger signal on the output 17, that signal being accepted by the input 74 of the data processing device 1. The data processing device 1 is reset at the moment when a signal appears at the input 13 of the internal operating cycle generator 21 (FIG. 3). Through the multichannel output 18 (FIG. 1) the data processing device 1 receives a microinstruction code with the result that appropriate signals are placed on the clock signal bus 15 to shown that the microinstruction code is available to the data processing device 1. This results in a condition in which the multichannel output 18 of the microprogram control device 8 produces no data, and the microprogram control device 8 enters a new cycle of microinstruction code generation. If the generated microinstruction contains a flag allowing for the reception of the result status information, the microprogram control device 8 enters a wait state and does not produce the next microinstruction. The data processing device 1 generates, in this case, the result status information passed through the multichannel output 19 and the communication line 55 (FIG. 3) and followed by the signal from the output 20 (FIG. 1). The microprogram control device 8 places a data-in complete signal at the output 16. If the microprogram control device 8 is not provided with the control unit 17 (FIG. 4), then said signals are routed via the clock signal bus 15 (FIG. 1). The data processing device 1 isolates the communication line 55 (FIG. 3) of the data exchange unit 52 from the multichannel output 19 (FIG. 1). The transfer of the result to and operands from the data processing device 1 is accomplished through the multichannel communication lines 2 and 3. A signal indicating that data is available on the multichannel communication lines 2 and 3 is routed over the signal buses 4 and 5 from the data processing device 1 or any other source (main storage). Also, the data processing device 1 or any other source place on buses 6 and 7 a data-in complete signal for the multichannel communication lines 2 and 3. If only the data exchange unit 52 is available, the result is transferred from and operands are received by the data processing device 1 using the communication line 55.

Said data transfer between the data processing device 1, the microprogram control device 8, and between external sources or destinations, is effected under control of the internal operating cycle generator 21 (FIG. 2) which operates as follows.

The multistable flip-flop configuration 22 changes from an $i$ state to an $i+1$ state, and from an $n$ state to the 1 state. If a state of the multistable flip-flop configuration 22 is designated as $s(i)$, then its transition process may be defined as follows: $s(i) \rightarrow s(i+1)$, provided that $i < n$, and $s(i) \rightarrow s(1)$, provided that $i = n$. Each state of the multistable flip-flop configuration 22 corresponds to a certain portion of data flow through the data processing device 1 (FIG. 1) and through the microprogram control device 8. An $s(1)$ state of the multistable flip-flop configuration 22 is a biased state. The multistable flip-flop configuration 22 changes to an $s(2)$ state from the $s(1)$ state when a signal appears at the trigger input 23. The multistable flip-flop configuration 22 takes up the $s(1)$ state when the input 24 accepts a signal that places the device in a state preceding the beginning of execution of a given instruction sequence. When in the $s(2)$ state (with a trigger signal at the input 23), the multistable flip-flop configuration 22 generates signals applied to the input 34 of the clock oscillator unit 33, to the input 26 of the delay unit 25, and, through the communication line 32, to the logical level status indicator 30. The clock oscillator unit 33 generates, at the output 35, clock signals following the data flow through the data processing device 1 (FIG. 1) and through the microprogram control device 8. The signals coming to the input 26 (FIG. 2) of the delay unit 25 are delayed somewhat according to a given portion of data flow, then arrive at the multichannel input 29 of the comparison unit 27. The multistable flip-flop configuration 22 provides signals for the logic level status indicator 30 which produces signals routed to the line 31. The multichannel input 29 of the comparison unit 27 accepts signals that show the conclusion of data flow through the data processing device 1 (FIG. 1) and through the microprogram control device 8. When the signals accepted by the multichannel inputs 28 and 29 (FIG. 2) are in coincidence, the comparison unit 27 generates signals passed to the multichannel input of the logic level status indicator 30 which is disabled and stops generation of signals to be passed to the line 31; then, via the line 32, signals are routed to the multistable flip-flop configuration 22 which takes up an s(3) state. If an external source or destination produces signals directed through the line 31, which are analogous to those from the logical level status indicator 30, no signals to switch the multistable flip-flop configuration 22 are routed over the line 32, and the multistable flip-flop configuration remains in the s(2) state. In the case of the s(3) state of the multistable flip-flop configuration 22, the same operation steps of the internal operating cycle generator 21 take place. Therefore, the multistable flip-flop configuration 22 is caused to change over sequentially to an s(n) state, then to the s(1) state in which it is held biased.

The internal operating cycle generator 21 (FIG. 13) operates as follows. The input 23 receives a signal to set the flip-flops 313, 314, 315, to a state preceding the beginning of execution of a given instruction sequence. The trigger input 24 receives a signal that causes the flip-flop 316 to change its state with the result that the input 360 of the OR gate 320 is logic 1. The input 361 of the flip-flop 315 produces a signal that changes the flip-flop 315 and causes the transfer of the multistable flip-flop configuration 22 from the s(1) state to the s(2) state. The signal from the output 344 of the flip-flop 315 comes to the input 339 of the delay line 324. When a read step is terminated, the input 348 of the AND gate 329 produces a data flow complete signal. The output of the AND gate 329 produces a signal, provided that the output 345 also produces a signal which acknowledges that the operation step is terminated. The input 351 of the driver 330 produces a signal that causes the driver 330 to change its state. If a signal from an external source or destination comes, in this case via the communication line 354, then the output 357 of the driver 330 is fed to the input 363 of the OR gate 319 and to the input 364 of the flip-flop 314. As a result, the flip-flop 315 is reset and the flip-flop 314 is caused to assume a state corresponding to a write operation, i.e., the s(3) state of the multistable flip-flop configuration 22. The following path is established for the transmission of said signals: the output 343 of the flip-flop 314, the input 340 of the delay line 325, the inputs 349 and 346 of the OR gate 328, the input 352 of the driver 331, the output 358 and the communication line 355 of the driver 331, the input 366 of the OR gate 318, and the input 365 of the flip-flop 313. An s(4) state of the multistable flip-flop configuration 22 corresponds to a readout operation when the signals are passed through the following path: the output 342 of the flip-flop 313, the input 341 of the delay line 326, the inputs 350 and 347 of the AND gate 327, the input 353, the output 359 and the communication line 356 of the driver 332, the input 367 of the flip-flop 316, and the input 368 of the OR gate 317. The flip-flops 313 and 316 are reset to take up the s(1) state. This results in the arrival at the input 360 of the AND gate 320 of a signal that enables the trigger input 24. At the same time, said signal causes the flip-flop 316 to change its state with the result that the input 360 accepts a signal that inhibits the reception of the next trigger signal. Each time data is passed, it is accompanied by the appearance of signals at the inputs 336, 337, 338 of the respective output drivers 321, 322, 323 which are activated, and clock signals are generated at their outputs 333, 334, 335. Therefore, a sequence of clock signals is generated in the internal operating cycle generator 21.

The data processing device 1 (FIG. 3) operates as follow. After being energized, it is placed in a state preceding the beginning of execution of a given instruction sequence using a trigger signal received by the input 24. The multistable flip-flop configuration 22 takes up a biased state s(1). The multichannel input 37 (FIG. 3) of the microinstruction register 36 accepts a microinstruction code, while the trigger input 23 (FIG. 2) accepts a signal that places the multistable flip-flop configuration 22 to the s(2) state. The microinstruction is set in the microinstruction register 36 (FIG. 3). After a time interval equal to the switching time of the clock oscillator unit 33 (FIG. 2), the output 132 (FIG. 3) of the internal operating cycle generator 21 generates a signal to isolate the microinstruction register 36 from the multichannel input 37. As a result, the microinstruction code is written in the microinstruction register 36. From the multichannel output 39, the microinstruction code comes to the microoperation decoder 38 which operates to decode it. On completion of the decoding of the microinstruction code, the internal operating cycle generator 21 produces a read signal obtainable from the output 83. In the data processing device 1, data is read, depending on the microinstruction code, from the registers of the general-purpose register unit 40, from the result status register 49, or from the result register 58.

If the microoperation decoder 38 generates signals delivered to the inputs 98, 100, 102 of the control units 76, 77, 78, respectively, the data processing device 1, prior to generation of a read signal, receives data routed through the communication lines 55, 56, 57 of the data exchange units 52, 53, 54, respectively. Data from the multichannel inputs 69, 67, 68 of their respective data exchange units 52, 53, 54, corresponding to the microinstruction code, arrives at the multichannel input 71 of the result register 58. The output 113 of the internal operating cycle generator 21 produces a reception signal delivered to the input 117 of the result register 58, and data directed to the multichannel input 71 is written in the result register 58. In a read operation, data is routed to the multichannel inputs 43 and 63 of the arithmetic/logic unit 42. The multichannel input 43 accepts either the contents of one of the registers of the general-purpose register unit 40 or partial contents of the microinstruction register 36. The multichannel input 63 accepts either the contents of one of the registers of the general-purpose register unit 40, the contents of the result register 58, or the contents of the result status register 49, depending on the available microinstruction code. The read out data is accepted by the multichannel inputs 43 and 63 of the arithmetic/logic unit 42 which performs a given operation (for instance, addition, subtraction, addition to unity, conjunction, disjunction, data transfer, modulo 2 addition, etc.); the type of operation to be performed is determined by control signals available to the input 139 from the microoperation decoder 38.

The bit extension unit 75 (FIG. 9) intended for transfer of carry signals or shift signals in accordance with the signals provided by the internal operation cycle generator 21 operates as follows. The input 79 accepts signals to display the current state of the data processing device 1 in the system. With logic 0 present on the input 79 of the bit extension unit 75, a high data processing device (say, 197 in FIGS. 5,6,7,8) is defined; with logic 1 on said input, a low data processing device 194, 195 or 196 is defined. In a read operation, logic 0 present on the input 79 (FIG. 3) activates the AND-OR-invert gate 218 when the input 80 (FIG. 9) of the bit extension unit 75 accepts a signal from the internal operating cycle generator 21.

The input 86 accepts a signal from the microoperation decoder 38 (FIG. 3) which, depending on the operation type, causes the logic information at the output 235 (FIG. 9) of the AND-OR-Invert gate 218 to change state. That signal is applied to the input of the OR gate 225. The output 242 generates a signal corresponding to logic 0 or logic 1 to be delivered to the NAND gate 227. Logic 0 corresponds to logical operations and to addition as well. On the other hand, logic 1 corresponds to the following operations: subtraction, complementing, and addition to unity. The input 82 of the bit extension unit 75 accepts a signal that activates the NAND gate 227 which generates a carry signal at the output 89. When the input 79 is logic 1, the AND-OR-Invert gate 218 is cutoff. Logic 0 from the output of the NOT gate 230 drives the AND-OR-Invert gate 219 to conduction. In a read operation the input 232 of the AND-OR-Invert gate 219 accepts a carry signal from the arithmetic/logic unit 42 (FIG. 3). The input 86 (FIG. 9) of the internal operating cycle generator 75 accepts a signal that activates the AND-OR-Invert gate 219 in the case of operations which require no data transfer from the result status register 49 (FIG. 3) to the output 89 (FIG. 9) of the bit extension unit 75. A signal from the output 236 of the AND-OR-Invert gate 219 is routed to the input of the OR gate 225. When the contents of the result status register 49 (FIG. 3) are handled, the AND-OR-Invert gate 220 (FIG. 9) is activated. In a read operation and with signals available at the input 133 and at the input 80, the output 237 of the AND-OR-Invert gate 220 produces a signal applied to the input of the OR gate 225. In the case of a shift operation involved in a write operation, a shift signal comes from the output 95 (FIG. 3) of the shifter 46 to the input 233 (FIG. 9) of the AND-OR-Invert gate 221, said signal being transferred to the input of the OR gate 225 from the output 238.

In a read operation occurring in the lay data processing devices 194, 195, 196 (FIGS. 5,6,7,8), the input 234 of the AND-OR-Invert gate 223 accepts a carry follow signal obtainable from the output (FIG. 3) of the arithmetic/logic unit 42. The AND-OR-Invert gate 223 (FIG. 9) is activated when a signal is accepted by the input 80.

The output 240 is connected to the input of the OR gate 226 whose output 243 is connected to the input of the NAND gate 228 which is forced into conduction upon arrival of a signal at the input 82. In a read operation occuring in the high data processing device 197 (FIGS. 5,6,7,8), with signals applied to the inputs 79, 80 and 86 (FIG. 9) of the bit extension unit 75, the output 241 of the AND-OR-Invert gate 224 generates a signal that comes to the input of the OR gate 226.

In a write operation the AND gate 229 transfers a shift signal applied to the output 90 and then delivers it to the output 96.

If the data processing device 1 (FIG. 3) handles operands whose length corresponds to its bit capacity, the input 91 of the arithmetic/logic unit 42 and the input 92 of the shifter 46 accept a signal from the output 89 of the bit extension unit 75, and the input 93 of the arithmetic/logic unit 42 accepts a signal that comes from the output 94 of the shifter 46 through the output 90. In a read operation, the bit extension unit 75 produces a carry signal and a carry follow signal. Logic information to define the high data processing device (say, that designated as 197 in FIG. 5) is applied to the input 79 of the bit extension unit 75. In this case, the latter generates at the output 89, when data is read, logic information corresponding to the operation type. When an add to unity, subtract, or complement operation is performed, the output 89 is logic 1 with the result that an appropriate signal appears at the output 90. The arithmetic/logic unit 42 receives signals delivered through the inputs 91, 93, performs a given operation, and its output 97 generates an end of operation signal applied to the internal operating cycle generator 21. In a read operation, the result is applied to the input 45 of the temporary result storage register 44 and is written therein using a gating signal available to the input 130. The end of operation signal is directed through the multichannel input 29 (FIG. 2) to the comparison unit 27. According to the operational procedure described above for the internal operating cycle generator 21, the multistable flip-flop configuration 22 is caused to change over to a state for the generation of write signals, in which case write signals are available from the output 35 of the clock oscillator unit 33 (which is the output 84 of the internal operating cycle generator 21). In a write operation, the bit extension unit 75 produces shift signals. In the case of a cyclic left shift operation, the output 95 of the shifter 45 is fed into the bit extension unit 75 whose output 89 produces a high-order position shift signal applied to the input 92 of the shifter 46. A cyclic left shift operation deals with the transfer of the hight order shift signal from the output 89 of the bit extension unit 75 to the low-order position through the input 92 of the shifter 46. In the case of a cyclic right shift operation, the low-order position shift signal is transferred from the output 94 of the shifter 46 to the output 90 of the bit extension unit 75 which, in turn, transfers that signal from the output 96 to the shifter 46, to the high-order position.

Unlike cyclic shift, a logic shift operation consists in that logic 0 available from the AND-OR-Invert gates 218 and 222 (FIG. 9) of the bit extension unit 75 appears in low- and high-order positions. In a logic shift operation, the bit extension unit 75 produces logic 0 at the output 89. In the case of a right shift operation, a shift signal from the output 94 (FIG. 3) of the shifter 46 comes through the output 90 in the bit extension unit 75. In a cyclic shift operation, a shift signal from the output 96 is directed to the shifter 46. In a logic shift operation, the bit extension unit 75 produces logic 0 delivered to the shifter 46. Data being transferred is gated by a write signal applied to the input 125 of the shifter 46. Concurrently, the operation result is applied to the multichannel input 71 of the result register 58 and is written therein using a gating write signal applied to the input 123. If a given microinstruction code allows the result to be written in one of the registers of the general-purpose register unit 40 or in the result status register 49, then data applied to the multichannel inputs 72 and 73 is written using write signals that arrive at inputs 124 and 126, respectively.

The result status register 49 is used to hold the following data: the operation result sign; the compare with zero result; the capacity overflow condition; end carries; shift signals. Data is applied to the multichannel input 51 and is written at the moment when a write enable signal from the microoperation decoder 38 appears at the input 50 and a write signal is applied to the input 126. If a microinstruction code contains flags that allow for the transfer of the operation result through the data exchange units 52, 53, 54 to the communication lines 55, 56, 57, then write signals applied to the inputs 120, 121, 122 of the control units 76, 77, 78 are used to gate the signals at the inputs 99, 101, 103 of the control units 76, 77, 78, produced by the microoperation decoder 38.

The control unit 76 (77, 78) (FIG. 10) operates as follows. The input 98 (100, 102) of the NAND gate 244 receives a signal from a respective output of the microoperation decoder 38 (FIG. 3) to acknowledge that data is available. The input 114 (115, 116) (FIG. 10) of the NAND gate 244 receives a data receive signal which changes logic information at the input 264 of the flip-flop 253 and causes the latter to assume its active state. At the same time, the input 114 (115, 116) accepts a signal from the internal operating cycle generator 21 (FIG. 3). After a data output follow signal is routed over the bus 104 (105, 106), logic information at the input 114 (115, 116) changes. A logic 1 signal appears at the input 266 of the flip-flop 253 and at the input 267 of the NAND gate 245.

As a result, a logic 1 signal appears at the inputs 265 and 267 of the NAND gate 245. The data output follow signal passed through the bus 104 (105, 106) changes the logic information at the output 114 (115, 116), and data input is terminated. The logic information at the input 262 of the NOT gate 256 changes, no receive signal is generated at the output 140 (142, 144), and a logic 1 signal appears at the input 263 of the NAND gate 245. The NAND gate 245 changes state, a logic 0 signal appears at the input 268 of the NOT gate 257 which, in turn, causes the appearance of a logic 1 signal at the input 270 of the NAND gate 246. A logic 0 signal appears at the input 269 of the NAND gate 247. A logic 1 signal appears at the input 271 of the NAND gate 246. The latter places logic 0 on the bus 107 (108, 109) to show that data is available to the data processing device 1 (FIG. 3). Logic 0 causes the NOT gate 258 (FIG. 10) to change its state and to produce logic 1 at its output. An external source receives a signal coming over the bus 107 (108, 109) and causes the logic information on the bus 104 (105, 106) to change to logic 1. Said signal causes the NOT gate 259 to assume its other state; the signal from the output of the latter gate is applied to the input 266 of the flip-flop 253 which changes its state, too. At the same time, logic 1 is accepted by the input of the NAND gate 247. As a result, logic 1 appears at all inputs of the NAND gate 247 whose output produces a logic 0 signal delivered to the input 271 of the NAND gate 246. Logic 1 is placed on the bus 107 (108, 109); before this event occurs, logic 1 is maintained at the output of the NOT gate 258. Th NOT gate 257 produces logic 0 at the input 270 of the NAND gate 246 logic 0. After that, data exchange between the data processing device 1 (FIG. 3) and an external source is complete.

If data is put out by the data processing device 1, the control unit 76 (77, 78) operates as follows. The input 99 (101, 103) of the microoperation decoder 38 accepts a signal that indicates data output from the data processing device 1. The input 120 (121, 122) accepts, from the internal operating cycle generator 21, a signal to indicate the occurrence of a write operation. The NAND gate 250 takes up its other state and logic 0 is delivered from its output to the input 273 of the flip-flop 254 to change the state of the latter. Now, the input 274 of the NAND gate 249 accepts a logic 1 signal. With data written, logic 1 appears at the input 272 of the NAND gate 249.

If logic 1 is placed on the bus 107 (108, 109), then logic 0 present at the output of the NAND gate 249 is accepted by the input 276 of the NAND gate 260 and by the input 277 of the NAND gate 251. This results in the appearance of a logic 1 signal at the inputs 278 and 280 of the NAND gate 248 which places logic 0 on the bus 104 (105, 106) applied to an external source. The output 141 (143, 145) generates a signal that enables data output from the data processing device 1. Also, this signal is applied to the input 281 (FIG. 10) of the flip-flop 255 to cause the latter to assume its other state. Therefore, the flip-flop 255 stores the data output condition. An external source receives data from the data processing device 1 (FIG. 3) and produces a data-in complete signal delivered over the bus 107 (108, 109) to the control unit 76 (77, 78). This signal causes the NAND gate 249 to change its state, and the output of this gate causes the NOT gate 260 to change its state, too. The input 280 of the NAND gate 248 accepts a logic 0 signal with the result that the gate takes up its other state and a logic 1 signal is placed on the bus 104 (105, 106) and is transferred to the input of the NOT gate 261 which produces a logic 0 signal at the input of the NOR gate 252. The input 275 of the latter accepts a logic 0 signal from the output of the flip-flop 254. As a result, the input 282 of the flip-flop 255 accepts a logic 1 signal, the flip-flop 255 changes its state and produces a logic 1 signal at the input 283 of the NAND gate 251. The output of the latter produces a logic 0 signal and the flip-flop 254 changes its state. Now, data output discontinues, and the control unit 76 (77, 78) is stopped. On completion of the write operation, the result comes to the multichannel inputs 64, 65 of the data exchange units 53, 54 from the output 60 of the result register 58 or to the multichannel input 66 of the data exchange unit 52 from the multichannel output of the result status register 49. The unit 76, 77 or 78 produces a data-out enable signal for the data exchange unit 52, 53 or 54 to be delivered to the input 141, 143 or 145 of the data exchange unit 52, 53 or 54, respectively. At the same time, a data-out follow signal generated by the control unit 76, 77 or 78 is placed on the bus 104, 105 or 106. An external source receives the signal coming over the bus 104, 105 or 106 and sends a data-in complete signal over the bus 107, 108 or 109. The control unit 76, 77 or 78 receives the signal passed over the bus 107, 108 or 109, causes the logic information at the input 141, 143 or 145 of the data exchange unit 52, 53 or 54 to change its state, and disables the latter with the result that no data is supplied over the communication line 55, 56 or 57. The execution of the given macroinstruction is terminated. Note that the specific logic information on the clock signal bus 138 corresponds to a certain portion of data flow being processed. The data processing device 1 (FIG. 1) or the microprogram control device 8 does not proceed to handle the next portion of data flow as long as an external source or destination places signals relating to the current portion of data flow on the clock signal bus 138.

The microprogram control device 8 operates as follows. The input 14 (FIG. 4) of the internal operating cycle generator 21 accepts a signal that places the device in a state preceding the beginning of execution of a given instruction sequence. The internal operating cycle generator 21 provides for specific logic information on the clock signal bus 167 and, in case the control unit 168 is present, produces a signal that places the control unit 168 in the receiving mode to expect a signal applied to the input 169 of the control unit 168.

The control unit 168 (171) (FIG. 11) operates as follows. The input 188 (189) accepts a data exchange enable signal for the microprogram control device 8 (FIG. 4). If the other input of the control unit 168 (171) connected to the output 182 (181) of the utility register 158 accepts a data exchange enable signal, then the output of the NAND gate 286 (FIG. 11) produces logic 0. Said signal is applied to the input 292 of the NAND gate 285 and to the input 293 of the flip-flop 289. The latter changes its state and its output produces logic 1. Changing logic information at the input 188 (189) of the control unit 168 (171) causes logic information at the input 292 of the NAND gate 285 to change with the result that logic 1 is produced. Now, the input 294 of the NOR gate 287 accepts logic 0. If an external source supplies logic 0 to the input 169 (172) which shows that data is available at the input 147 (149) (FIG. 4) of the input register 146, then logic 1 appears at the input 295 of the flip-flop 288; thus, the flip-flop 288 changes its state and produces logic 1 at the input 296 of the NAND gate 284. The input 297 of the NAND gate 284 accepts logic 1 and the gate produces logic 0 at the output 170 (173), which corresponds to the supply signal from the control unit 168 (171). An external source provides logic 1 at the input 169 (102) with the result that the flip-flops 288, 289 assume their other states and logic 1 appears at the output 170 (173). After that, the operation of the control unit 168 (171) is over.

The microprogram control device 8 is held in the receiving mode to except an instruction code produced by an external source (not shown). With the input 169 of the control unit activated, the latter changes its state to produce a signal coming to the input 183 of the input register 146 and to the input 184 of the internal operating cycle generator 21. The instruction code from the multichannel input 147 is written in the input register 146. The signal available at the input 184 tends to place the internal operating cycle generator 21 in the next state in which a gating signal is available from the output 174. At this moment, data flow is directed to the multichannel inputs 151, 152, 161 of the programmable address unit 150. The multichannel input 153 of the microinstruction storage unit 154 accepts a microinstruction address, and the input 175 accepts the gating signal just at this point in time. Data from the multichannel output 155 of the microinstruction storage unit 154 arrives at the microinstruction register 156, from the output 159 at the feedback register 160, and from the output 157 at the utility register 158.

The utility register 158 (FIG. 12) operates as follows. The inputs 307, 306, 305, 304, 303 of the flip-flops 298-302, respectively, accept data from the multichannel output 157 (FIG. 4) of the microinstruction storage unit 154. A gating write signal is applied to the inputs 308-312 (FIG. 12) of the flip-flops 298-302, respectively, each being capable of writing either direct or inverse data only. Outputs 177, 178, 180, 181, 182 (FIG. 4) serve to transfer data to the respective units and registers of the microprogram control device 8. The signal from the output 176 of the microinstruction storage unit 154 comes to a respective input of the internal operating cycle generator 21 which is caused to assume its next state and produces, at the outputs 191, 192, signals that follow the data delivered to the microinstruction register 156 and the utility register 158, respectively. After a time interval within which data is written in the microinstruction register 156 and in the utility register 158, the internal operating cycle generator 21 is placed in the next state in which a microinstruction is being passed through the multichannel output 164. Specific logic information appears at the clock signal bus 166. If an external source, say, the data processing device 1, places data-out initiate signals on the clock signal bus 166, the internal operating cycle generator 21 produces, at the output 193, an enable signal for data flow from the multichannel output 162 of the microinstruction register 156, via the output driver unit 163, to the multichannel output 164. With data written in the microinstruction register 156, in the feedback register 160 and in the utility register 158, a signal appears at the output 174 of the internal operating cycle generator 21 to place the programmable address unit 150 and the microinstruction storage unit 154 in a state of readiness to pass the next portion of data flow. The address of the next microinstruction is written, as a result, in the feedback register 160. An external destination (the data processing device 1) receives the microinstruction and causes a change in the logic information at the clock signal bus 166. The internal operating cycle generator 21 responds to the state of the signals available on the clock signal bus 166 and is then caused to assume a new state in which it produces no signals for the output 193. No data is delivered to an external destination from the multichannel output 164 and from the trigger output 165. At the same time, a signal to feed new input data appears at the output 174 of the internal operating cycle generator 21. In a like manner, the signal from the output 176 of the microinstruction storage unit 154 serves to place the internal operating cycle generator 21 in a new state with the result that the logic information at the clock signal bus 166 changes. If an external destination produces an appropriate signal at the clock signal bus 166, the internal operating cycle unit 21 produces a data-out initiate signal at the output 193. The utility register 158 produces, at the output 177, logic information which assumes one state to enable a microinstruction to go to the multichannel input 164 and the other state to inhibit the passage of the microinstruction. The input 176 of the internal operating cycle generator 21 accepts a signal to transfer the microprogram control device 8 to the next read state to read a new microinstruction regardless of the state of the logic information on the clock signal bus 166, produced by an external destination, while the signal at the input 179 serves to change the state of the logic information on the clock signal bus 167 of the internal operating cycle generator 21. This acknowledges that the next microinstruction is received by the input register 146. The signal coming from the output 182 of the utility register 158 to the input of the control unit 168 prepares the latter for the reception of a new instruction. The signal from the output 181 of the utility register 158 serves to prepare the control unit 171 for the reception of the data passed to the input register 148 from the multichannel input 149.

The signal produced by the output 180 of the utility register 158 serves a dual purpose: it enables writing of the next address, using a gating signal from the output 190 of the internal operating cycle generator 21, or inhibits this action, depending on the state of the logic information at the output 180. Therefore, the microprogram control device 8 produces a microinstruction sequence in accordance with a specific code available to the input register 146 and the result status information contained in the input register 148.

The data processing devices 194–197 (FIG. 5) and the microprogram control device 8 operate as follows. The input 198 of the data processing devices 194–197 and the input 14 of the microprogram control device 8 accept signals that place said devices in a state preceding the beginning of execution of a given instruction sequence. The input 79 of the data processing device 197 referred to as a high one takes a specific signal, while the inputs 79 of the data processing devices 194, 195, 196 referred to as low ones accept their specific signals. Using an instruction code written from the multichannel input 9, the microprogram control device 8 produces a microinstruction at the output 18 and a trigger signal at the output 17. The data processing devices 194–197 receive the microinstruction code and place appropriate signals on the combined clock signal buses 15 which allow the data processing devices 194–197 to handle concurrently a certain portion of the available data flow. The microprogram control device 8 stops the delivery of the microinstruction to the multichannel output 18, and the multichannel output 89 of the data processing devices 194–197 produces carry signals. The clock signal bus 15 produces signals corresponding to a read step. The data processing devices 194–197 enter a state for writing data, provided carry follow signals are present on all connections 201 of said devices. If the logic information on the clock signal buses 15 changes, the data processing devices 194–197 are made ready to write data, and shift signals appear on the outputs 89 and the connections 201. When the logic information on the clock signal buses 15 indicates that a write step has been completed, write complete signals appear at the outputs 89 and connections 201. If a microinstruction being processed contains an indication about data output from the data processing devices 194–197, then, after the data has been written, a signal appears at the bus 201, at the bus 203 or at the input 200 of the microprogram control device 8 indicating that data is delivered through the multichannel line 2 or 3 to an external source or destination, or to the multichannel input 199 of the microprogram control device 8. Using the communication line 55, the data processing device 197 transfers the contents of the result status register 149 (FIG. 3) to the input 199 of the microprogram control device 8 when a certain microinstruction code is present. Using the communication lines 155, the data processing devices 194, 195, 196 (FIG. 5) transfer the compare with zero result only. In the case of other microinstruction codes, the data processing devices 194–197 transfer data therebetween using the communication lines 55. Any one of the data processing devices 194–197 which outputs data provides it with a follow signal coming through the bus 104, while any one of the data processing devices 194–197 which receives data generates a reply signal passed over the bus 107. The microprogram control device 8 receives the result status information signals applied to the multichannel input 199. A data-out follow signal comes over the buses 104 to the input 200, and the output 16 generates a data-in complete signal passed to the buses 107.

The serial microprogram control devices 206, 207 (FIG. 6) provide for a two-level execution control. The input 14 of the microprogram control device 207 of the lowest control level and the input 14 of the microprogram control device 206 of the highest control level accept signals that place the respective devices in a state preceding the beginning of execution of a given instruction sequence. The multichannel input 9 of the microprogram control device 206 accepts an instruction code followed by the signal applied to the input 10. The multichannel output 18 of the microprogram control device 206 produces a microinstruction code to be delivered to the multichannel input 9 of the microprogram control device 207. The input 10 of the microprogram control device 207 accepts a data-in enable signal for the input 9 of the microprogram control device 207 from the trigger output 17 of the microprogram control device 206. The microinstruction coming from the multichannel output 18 of the microprogram control device 206 is decoded in the microprogram control device 207 with the result that a microinstruction sequence is produced to control the data processing devices 194–197. After the entire microinstruction sequence has been put out from the microprogram control device 207, the latter transfers a signal to the clock signal bus 12, that enables reading of the next microinstruction from the microprogram control device 206. With the entire microinstruction sequence put out from the microprogram control device 206, the latter places a signal onto the clock signal bus 12, that enables supply of the next instruction to the multichannel input 9 of the microprogram control device 206. The instruction is received after a signal appears at the input 10 of the microprogram control device 206, this signal being used to follow the instruction supplied from an external source.

The parallel microprogram control devices 208, 209, 210 (FIG. 7) provide for an increase in the amount of microprogram storage. The microprogram control devices 208, 209, 210 operate all together to constitute a signal control level. The input 14 of the microprogram control devices 208, 209, 210 and the input 198 of the data processing devices 194–197 accept signals that place said devices in a state preceding the beginning of execution of a given instruction sequence. Logic information corresponding to data reception appears on the clock signal bus 214 of the microprogram control device 208, 209, 210. The multichannel input 211 of the microprogram control devices 208, 209, 210 accepts an instruction code followed by a signal at the input 212. The microprogram control devices 208, 209, 210 receive this instruction code and produce a data-in complete signal at the output 213. The multichannel inputs 199 of the microprogram control devices 208, 209, 210 accept the result status information; said devices interconnected by the clock signal buses 15 and 12 start handling a certain portion of data flow concurrently.

There are two operating modes in which microinstruction codes are delivered to the multichannel outputs 18. In the first mode, one microprogram control device, say, the microprogram control device 208, produces a microinstruction code. In this case, in the microprogram control devices 209, 210 there is a signal at the output 177 (FIG. 4) of the utility register 177 to inhibit data output from the output driver unit 163. In the case of the second mode, the microprogram control devices 208, 209, 210 operate to concurrently deliver microinstructions to the multichannel output 18. Data at the combined multichannel outputs 18 of the microprogram control devices 208, 209, 210 are converted to the result obtained due to the performance of a certain logic function at the combined outputs 18 of the microprogram control devices 208, 209, 210.

In the case of parallel/serial microprogram control devices 215, 216, 217 (FIG. 8) and parallel data processing devices 194–197, the microprocessor computing system operates as follows. The inputs 14 of the microprogram control devices 215, 216, 217 and the input 198 of the data processing devices 194–197 accept signals that place them in a state preceding the beginning of execution of a given instruction sequence. The input 9 of the data processing device 217 accepts an instruction code which is converted in the microprogram control device 217 to a sequence of microinstructions each being decoded in the microprogram control devices 215, 216 into another sequence of microinstructions. The microprogram control devices 215, 216 operate in a manner similar to that of the parallel microprogram control devices 208, 209, 210 (FIG. 7). The multichannel inputs 199 of the microprogram control devices 215, 216, 217 accept the result status information.

The proposed microprocessor computing system offers the following advantages. Due to the presence of the internal operating cycle generator and the clock signal buses, which allow all functional components to be combined into an integrated computing system, computing systems of various functional capabilities may be provided so that there is no necessity to adjust a specific system as a whole or its independent functional components. The parallel data processing devices used to realize the processing portion of the microprocessor computing system make it possible to handle operands having a length which is a multiple of the number of data processing devices involved. The speed of the processing portion of the system is not practically affected by the number of data processing devices available, since each device operates off-line.

The microprogram control devices provide for both a single-level and a multilevel control. In the case of a signal-level control, the capacity of microprogram storage is increased due to the availability of parallel data processing devices. The combined clock signal buses allow for synchronous operation of the microprogram control devices. Here, there is no need to use ancillary synchronization means for these devices. In the case of serial microprogram control devices, multilevel control is provided. Also, the availability of several control levels permits an increase in the capacity of microprogram storage in the presence of a lesser quantity of devices as compared to the use of parallel microprogram control devices, depending on the instruction set employed. A serial/parallel arrangement of the microprogram control devices provides for a rational configuration of a computing system. The clock signal buses to connect the processing portion to the microprogam control devices, as well as the signal buses to effect data exchange, permit computing systems to be realized without ancillary means. The control units serve to transfer data between the devices on the off-line basis. Since the arithmetic/logic unit in the data processing device is coupled to the internal operating cycle generator, each operation handled in the data processing device is terminated independently. The utility register in the microprogram control device affords an increased functional flexibility of the latter due to the presence of positions in which information on changeovers of the units and registers in the course of data flow is written.

What is claimed is:

1. A microprocessor computing system wherein at least one data processing device is provided, each data processing device comprising:

a microinstruction register for storing microinstruction codes having a multichannel input, a first and a second input, and a multichannel output;

a microoperation decoder having a multichannel input and a group of outputs, said multichannel output of said microinstruction register being coupled to said multichannel input of said microoperation decoder;

a general-purpose register unit for storing operands having a group of inputs, a multichannel input, a first multichannel output, and a second multichannel output;

an arithmetic/logic unit having inputs, first and second multichannel inputs, outputs, and a multichannel output, said multichannel output of said microinstruction register and said first multichannel output of said general-purpose regisrer unit being combined and connected to said first multichannel input of said arithmetic/logic unit, said second multichannel output of said general-purpose register unit being connected to said second multichannel input of said arithmetic/logic unit;

a temporary result storage register having a multichannel input, an input and a multichannel output, said multichannel output of said arithmetic/logic unit being connected to said multichannel input of said temporary result storage register;

a shifter having inputs, a multichannel input, a first output and first and second multichannel outputs, said multichannel output of said temporary result storage register being connected to said multichannel input of said shifter;

a result status register having a group of inputs, first and second multichannel inputs, and first and second multichannel outputs, said first multichannel output of said shifter being connected to said first multichannel input of said result status register, said second multichannel output of said result status register being connected to said second multichannel input of said arithmetic/logic unit;

a result register having a group of inputs, a multichannel input, and a multichannel output, said multichannel output of said result register being connected to said second multichannel input of said arithmetic/logic unit;

at least one data exchange unit having a first communication line to provide for data exchange between other sources and destinations, a multichannel input to accept result status information signals from said data processing device, a multichannel output, and a second communication line to provide for data communication between other sources and destinations, said first multichannel output of said result status register being connected to said multichannel input of said data exchange unit, said second multichannel output of said shifter and said multichannel output of said data exchange unit being combined and connected to said second multichannel input of said result status register, to said multichannel input of said general-purpose register unit, and to said multichannel input of said result register;

an internal operating cycle generator producing clock signals for the internal operating cycle to control data sequencing in said data processing device and having an input that receives a signal that places said data processing device in a state preceding the beginning of execution of a given instruction sequence, a trigger input, a group of inputs, a group of outputs, and a clock signal bus, a first output of said outputs of said arithmetic/logic unit being connected to a second input of said group of inputs of said internal operating cycle generator, a first output of said group of outputs of said internal operating cycle generator being connected to a second input of said group of inputs of said general-purpose register unit, to a second input of said group of inputs of said result status register, and to a second input of said group of inputs of said result register, a second output of said group of outputs of said internal operating cycle generator being connected to said first input of said microinstruction register, a third output of said group of outputs of said internal operating cycle generator being connected to said second output of said microinstruction register, to a third input of said group of inputs of said general-purpose register unit, to said input of said temporary result storage register, to a third input of said group of inputs of said result status register, and to a third input of said group of inputs of said result register, a fourth output of said group of outputs of said internal operating cycle generator being connected to a fourth input of said group of inputs of said general-purpose register unit, to a second input of said inputs of said shifter, to a fourth input of said group of inputs of said result status register, and to a fourth input of said group of inputs of said result register, a fifth output of said group of outputs of said internal operating cycle generator being connected to a fifth input of said group of inputs of said general-purpose register unit, to a fifth input of said group of inputs of said result status register, and to a fifth input of said group of inputs of said result register;

said outputs of said microoperation decoder being connected, respectively, to a first input of said group of inputs of said general-purpose register unit, to a first input of said inputs of said arithmetic/logic unit, to a first input of said inputs of said shifter, to a first input of said group of inputs of said result status register, to a first input of said group of inputs of said result register, and to a first input of said group of inputs of said internal operating cycle generator;

said microprocessor computing system also includes at least one group of control elements to constitute a control level made up of at least one microprogram control device which is a group of first-order control elements and comprises:

at least one input register having a multichannel input, an input and a multichannel output, a first group of channels of said multichannel input of said input register receiving instruction codes from an external source and constituting an instruction code input of said group of first-order control elements, a second group of channels of said multichannel input of said input register receiving result status information and constituting a result status information input of said group of first-order control element, said result status information input of said group of first-order control elements being connected to one of said communication lines of said at least one data exchange unit of said data processing device;

a programmable address unit having an input, a group of multichannel inputs, an output, and a multichannel output, said multichannel output of each of said input registers being connected to one of said multichannel inputs of said group of multichannel inputs of said programmable address unit;

a microinstruction storage unit having an input, a multichannel input, an output and a group of multichannel outputs, said multichannel output of said programmable address unit being coupled to said multichannel input of said microinstruction storage unit, said output of said programmable address unit being coupled to said input of said microprogram storage unit;

a feedback register having a first and second input, a multichannel input and a multichannel output, a second multichannel output of said group of multichannel outputs of said microinstruction storage unit being connected to said multichannel input of said feedback register, said multichannel output of said feedback register being connected to one of said multichannel inputs of said group of multichannel inputs of said programmable address unit;

a microinstruction register having an input, a multichannel input, and multichannel output, a first multichannel output of said group of multichannel outputs of said microinstruction storage unit being coupled to said multichannel input of said microinstruction register;

an output driver unit having a first input, a second input, a multichannel input, a trigger output, which is the trigger output of said group of first-order control elements, and a multichannel output, which is the multichannel output of said group of first-order control elements, said multichannel output of said microinstruction register being coupled to said multichannel input of said output driver unit, said multichannel output of said group of first-order control elements being connected to said multichannel input of said microinstruction register of said data processing device, said trigger output of said group of first-order control elements being connected to said trigger input of said internal operating cycle generator of said data processing device;

an internal operating cycle generator which produces clock signals for the internal operating cycle to control data sequencing in said microprogram control device and having an input to accept a signal that places said device in a state preceding the beginning of execution of a given instruction sequence, a trigger input, a group of inputs, a group of outputs, and at least one clock signal bus, said output of said microprogram storage unit being coupled to a first input of said group of inputs of said internal operating cycle generator, a first output of said group of outputs of said internal operating cycle generator being coupled to said input of said programmable address unit, a second output of said group of outputs of said internal operating cycle generator being coupled to said input of said microinstruction register, a third output of said group of outputs of said internal operating cycle generator being coupled to said second input of said output driver unit, said clock pulse bus of said internal operating cycle generator being coupled to said clock pulse bus of said internal operating cycle generator of said data processing device.

2. A microprocessor computing system as set forth in claim 1, wherein a plurality of data processing devices are available, which operate in parallel to provide for the extension of the width of parallel-processed data, each data processing device further comprising:

a bit extension unit having a group of inputs and first and second outputs;

said arithmetic/logic unit having second and third inputs and second and third outputs;

said shifter having third and fourth inputs and a second output;

said result status register having an output;

a first input of said group of inputs of said bit extension unit, to accept signals from an external source, indicating the current state of said data processing device, a second input of said group of inputs of said bit extension unit connected to said first output of said shifter, a third input of said group of inputs of said bit extension unit coupled to a respective output of said group of outputs of said microoperation decoder, a fourth input of said group of inputs of said bit extension unit coupled to said output of said result status register, a fifth input of said group of inputs of said bit extension unit coupled to said third output of said internal operating cycle generator, a sixth input of said group of inputs of said bit extension unit coupled to said fourth output of said internal operating cycle generator, a seventh input of said group of inputs of said bit extension unit coupled to said fifth output of said internal operating cycle generator, said first output of said bit extension unit being coupled to said third input of said shifter;

said arithmetic/logic units and said bit extension units of all data processing devices being series-connected in a closed loop;

said second and third outputs of said arithmetic/logic units of each of said data processing devices being coupled, respectively, to eighth and ninth inputs of said group of inputs of said bit extension unit of each of said data processing devices;

said second output of said bit extension unit of one of said data processing devices which generates a carry signal and a shift signal, being coupled to said fourth input of said shifter and to said second input of said arithmetic/logic unit of another one of said data processing devices;

said bit extension unit of one of said data processing devices being connected to said second output of said shifter and to said third input of said arithmetic/logic unit of another one of said data processing devices, to transfer a carry follow signal and a shift signal;

said trigger inputs of said internal operating cycle generator of all said data processing devices being combined and connected to said trigger output of said group of first-order control elements;

said multichannel inputs of said microinstruction registers of all said data processing devices being combined and connected to said multichannel output of said group of first-order control elements;

all said data processing devices incorporating an equal number of said data exchange units;

said communication lines of said microinstruction registers of all data processing devices being combined and coupled to said result status information input of said group of first-order control elements.

3. A microprocessor computing system as set forth in claim 2, wherein said data processing device further comprises:

at least one control unit having a group of inputs, a group of outputs, a first bus to hold data-in enable signals and data-out follow signals, and a second bus for data-in/data-out complete signals, said control units being equal in number to said data exchange units, first and second inputs of said group of inputs of said control unit coupled to respective outputs of said microoperation decoder, a third input of said group of inputs of said control unit connected to said first output of said internal operating cycle generator, a fourth input of said group of inputs of said control unit coupled to said fourth output of said internal operating generator, a first output of said group of outputs of said control unit coupled to a third input of said internal operating cycle generator;

said data exchange unit having first and second inputs, second and third outputs of said group of outputs of said control unit coupled, respectively, to said first and second inputs of a respective one of said data exchange units.

4. A microprocessor computing system as set forth in claim 3, wherein said microprogram control device further comprises:

a utility register holding said microprogram control device transition condition codes and having an input, a multichannel input, and group of outputs, said multichannel input of said utility register being coupled to a third multichannel output of said group of multichannel outputs of said microinstruction storage unit, said input of said utility register being coupled to a fourth output of said group of outputs of said internal operating cycle generator, a first output of said group of outputs of said utility register coupled to said first input of said output driver unit, a second output of said group of outputs of said utility register coupled to a second input of said group of inputs of said internal operating cycle generator, a third output of said group of outputs of said utility register coupled to a second input of said feedback register;

at least one control unit having a group of inputs and a group of outputs, said control units being equal in number to said input register, a first input of said group of inputs of said control unit to accept data-in initiate signals, a first output of said group of outputs of said control unit to generate data-in complete signals, a second input of said group of inputs of said control unit connected to a fifth output of said group of outputs of said internal operating cycle generator a third input of said group of inputs of said control unit coupled to a fourth output of said group of outputs of said utility register, a second output of said group of outputs of said control unit coupled to said input of a respective input register and to a second input of said group of inputs of said internal operating cycle generator.

5. A microprocessor computing system as set forth in claim 4, comprising:

at least two said groups of first-order control elements connected in series to provide for multilevel execution control so that sequential control levels are formed;

each of said microprogram control devices of said groups of first-order control elements comprising an equal number of said input registers;

said instruction code input of said group of first-order control elements of a lower control level being connected to said multichannel output of said group of first-order control elements representing a higher control level:

said group of first-order control elements of the lowest control level having said multichannel output connected to said multichannel input of said microinstruction register of said data processing device and said trigger output connected to said trigger input of said internal operating cycle generator of said data processing device;

said inputs to accept the result status information of said input registers of said groups of first-order control elements being combined to form a common input;

said first common input of said first input registers being connected to said communication line of said data exchange unit of said data processing device;

said trigger output of said group of first-order control elements of a higher control level being connected to said first input of said first control unit of said group of first-order control elements of a subsequent lower control level.

6. A microprocessor computing system as set forth in claim 4, comprising:

at least two parallel groups of first-order control elements forming a group of second-order control elements to constitute a control level;

each of said microprogram control devices of said control groups comprising an equal number of input registers;

said first groups of channels of said multichannel inputs of said input registers of said microprogram control devices being combined to form an instruction code input of said group of second-order control elements;

said second groups of channels of said multichannel inputs of said input registers of said microprogram control devices being combined to form the result status information input of said group of second-order control elements and connected to said combined communication line of said data processing device;

said data-in initiate signal inputs of said control units of said microprogram control devices being combined to form the data-in initiate signal input of said group of second-order control elements;

said data-in complete signal outputs of said control units of said microprogram control devices being combined to form the data-in complete signal output of said group of second-order control elements;

said multichannel outputs of said output driver units of said microprogram control devices being combined to form the multichannel output of said group of second-order control elements, which is connected to said combined multichannel input of said microinstruction registers of said data processing device;

said trigger outputs of said output driver units of said microprogram control devices being combined to form the trigger output of said group of second-order control elements which is coupled to said trigger input of said parallel data processing devices.

7. A microprocessor computing system as set forth in claim 4, comprising:

at least two sequential execution control levels, at least one of said control levels being provided by a group of second-order control elements, said group of second-order control elements incorporating at least two said microprogram control devices connected in parallel, said sequential execution control levels being provided by serial connection of said groups of control elements, each of said microprogram control devices of said groups of control elements incorporating an equal number of input registers;

said first groups of channels of said multichannel inputs of said input registers of said microprogram control devices of said group of second-order control elements being combined to form an instruction code input, said second groups of channels of said multichannel inputs of said input registers of said microprogram control devices of said group of second-order control elements being combined to form a result status information input, said data-in initiate signal inputs of said control units of said microprogram control devices of said group of the second-order control elements are combined to form a data-in initiate signal input, said data-in complete signal outputs of said control units of said microprogram control devices of said group of second-order control elements being combined to form a data-in complete signal output, said multichannel outputs of said output driver units of said microprogram control devices of said group of second-order control elements being combined to form the multichannel output of said group of second-order control elements, said instruction code input of said group of control elements of a lower control level being connected to said multichannel output of said group of control elements of a higher control level, said group of control elements of the lowest control level having said multichannel output being connected to the combined multichannel input of said parallel data processing devices and having said trigger output connected to the combined trigger input of said parallel data processing devices, said result status information inputs of said groups of control elements being combined to form a common input,
said first common input of said groups of control elements being connected to said communication line of said data exchange unit of said data processing device,
said trigger output of said group of control elements of a higher control level being connected to said first input of said first control unit of a subsequent lower control level.

8. A microprocessor computing system as set forth in claim 1, wherein said microprogram control device further comprises:
a utility register holding said microprogram control device transition condition codes and having an input, a multichannel input, and a group of outputs,
said multichannel input of said utility register being coupled to a third multichannel output of said group of multichannel outputs of said microinstruction storage unit,
said input of said utility register being coupled to a fourth output of said group of outputs of said internal operating cycle generator,
a first output of said group of outputs of said utility register coupled to said first input of said output driver unit,
a second output of said group of outputs of said utility register coupled to a second input of said group of inputs of said internal operating cycle generator,
a third output of said group of outputs of said utility register coupled to a second input of said feedback register;
at least one control unit having a group of inputs and a group of outputs,
said control units being equal in number to said input registers,
a first input of said group of inputs of said control unit to accept data-in initiate signals,
a first output of said group of outputs of said control unit to generate data-in complete signals,
a second input of said group of inputs of said control unit coupled to a fifth output of said group of outputs of said internal operating cycle generator,
a third input of said group of inputs of said control unit coupled to a fourth output of said group of outputs of said utility register,
a second output of said group of outputs of said control unit coupled to said input of a respective input register and to a second input of said group of inputs of said internal operating cycle generator.

9. A microprocessor computing system as set forth in claim 8 comprising:
at least two said groups of first-order control elements connected in series to provide for a multilevel execution control so that sequential control levels are formed;
each of said microprogram control devices of said groups of first-order control elements comprising an equal number of said input registers;
said instruction code input of said group of first-order control elements of a lower control level being connected to said multichannel output of said group of first-order control elements representing a higher control level;
said group of first-order control elements of the lowest control level having said multichannel output connected to said multichannel input of said microinstruction register of said data processing device and said trigger output connected to said trigger input of said internal operating cycle generator of said data processing device;
said inputs to accept the result status information of said input registers of said groups of first-order control elements being combined to form a common input;
said first common input of said first input registers being connected to said communication line of said data exchange unit of said data processing device;
said trigger output of said group of first-order control elements of a higher control level being connected to said first input of said first control unit of said group of first-order control elements of a subsequent lower control level.

10. A microprocessor computing system as set forth in claim 8, comprising:
at least two parallel groups of first-order control elements forming a group of second-order control elements to constitute a control level;
each of said microprogram control devices of said control groups comprising an equal number of input registers;
said first groups of channels of said multichannel inputs of said input registers of said microprogram control devices being combined to form an instruction code input of said group of second-order control elements;
said second groups of channels of said multichannel inputs of said input registers of said microprogram control devices being combined to form the result status information input of said group of second-order control elements and connected to said communication line of said data exchange unit of said data processing device;
said data-in initiate signal inputs of control units of said microprogram control devices being combined to form the data-in initiate signal input of said group of second-order control elements;
said data-in complete signal outputs of said control units of said microprogram control devices being combined to form the data-in complete signal output of said group of second-order control elements;
said multichannel outputs of said output driver units of said microprogram control devices being combined to form the multichannel output of said group of second-order control elements which is coupled to said multichannel input of said microinstruction register of said data processing device;
said trigger outputs of said output driver units of said microprogram control devices being combined to form the trigger output of said group of second-order control elements, which is coupled to said trigger input of said internal operating cycle generator of said data processing device.

11. A microprocessor computing system as set forth in claim 8, comprising:
at least two sequential execution control levels,
at least one of said control levels being provided by a group of second-order control elements,
said group of second-order control elements incorporating at least two said microprogram control devices connected in parallel,
said sequential execution control levels being provided by serial connection of said groups of control elements, each of said microprogram control devices of said groups of control elements incorporating an equal number of input registers;

said first groups of channels of said multichannel inputs of said input registers of said microprogram control devices of said group of second-order control elements being combined to form an instruction code input, said second groups of channels of said multichannel inputs of said input registers of said microprogram control devices of said group of second-order control elements being combined to form a result status information input, said data-in initiate signal inputs of said control units of said microprogram control devices of said group of second-order control elements are combined to form a data-in initiate signal input, said data-in complete signal inputs of said control units of said microprogram control devices of said group of second-order control elements being combined to form a data-in complete signal output, said multichannel outputs of said output driver units of said microprogram control devices of said group of second-order control elements being combined to form the multichannel output of said group of second-order control elements, said instruction code input of said group of control elements of a lower control level being connected to said multichannel output of said group of control elements of a higher control level, said group of control elements of the lowest control level having said multichannel output being connected to said multichannel input of said microinstruction register of said data processing device and having said trigger output connected to said trigger input of said internal operating cycle generator of said data processing device, said result status information inputs of said group of control elements being combined to form a common input, said first common input of said groups of control elements being connected to said communication line of said data exchange unit of said data processing device, said trigger output of said group of control elements of a higher control level being connected to said first input of said first control unit of a subsequent lower control level.

12. A microprocessor computing system as set forth in claim 1, wherein said internal operating cycle generator of said data processing device and said microprogram control device comprises:

a multistable flip-flop configuration having a trigger input, an input to accept a signal that places the respective device in a state preceding the beginning of execution of a given instruction sequence, and first and second multichannel outputs;

a delay unit having a multichannel input and a multichannel output, said multichannel output of said multistable flip-flop configuration being connected to said multichannel input of said delay unit;

a comparison unit, to compare the delayed signals of said multistable flip-flop configuration and the end of operation step signals, having a first multichannel input and second multichannel input, to accept the end of operation step signals, and a multichannel output, said multichannel input of said comparison unit being connected to said first multichannel output of said delay unit;

a logic level status indicator to provide indications on said clock signal bus having a multichannel input, said multichannel output of said delay unit being connected to said multichannel input of said logic level status indicator, said logic level status indicator being connected through a line to said multistable flip-flop configuration, said logic level status indicator being connected through a line to said clock signal bus;

a clock oscillator unit having a multichannel input and a multichannel output, said second multichannel output of said multistable flip-flop configuration being connected to said multichannel input of said clock oscillator unit.

13. A microprocessor computing system as set forth in claim 12, wherein said microprogram control device further comprises:

a utility register holding said microprogram control device transition condition codes and having an input, a multichannel input, and a group of outputs, said multichannel input of said utility register being coupled to a third multichannel output of said group of multichannel outputs of said microinstruction storage unit, said input of said utility register being coupled to a fourth output of said group of outputs of said internal operating cycle generator, a first output of said group of outputs of said utility register coupled to said first input of said output driver unit, a second output of said group of outputs of said utility register coupled to a second input of said group of inputs of said internal operating cycle generator, a third output of said group of outputs of said utility register coupled to a second input of said feedback register;

at least one control unit having a group of inputs and a group of outputs, said control units being equal in number to said input register, a first input of said group of inputs of said control unit to accept data-in initiate signals, a first output of said group of outputs of said control unit to generate data-in complete signals, a second input of said group of inputs of said control unit coupled to a fifth output of said group of outputs of said internal operating cycle generator, a third input of said group of inputs of said control unit coupled to a fourth output of said group of outputs of said utility register, a second output of said group of outputs of said control unit coupled to said input of a respective input register and to a second input of said group of inputs of said internal operating cycle generator.

14. A microprocessor computing system as set forth in claim 13, comprising:

at least two said groups of first-order control elements connected in series to provide for a multilevel execution control so that sequential control levels are formed;

each of said microprogram control devices of said groups of first-order control elements comprising an equal number of said input registers;

said instruction code input of said group of first-order control elements of a lower control level being connected to said multichannel output of said group of first-order control elements of a higher control level;

said group of first-order control elements of the lowest control level having said multichannel output connected to said multichannel input of said microinstruction register of said data processing device and said trigger output connected to said trigger input of said internal operating cycle generator of said data processing device;

said inputs to accept the result status information of said input registers of said groups of first-order control elements being combined to form a common input;

said first common input of said first input registers being connected to said communication line of said data exchange unit of said data processing device;

said trigger output of said group of first-order control elements of a higher control level being connected to said first input of said first control unit of said group of first-order control elements of a subsequent lower control level.

15. A microprocessor computing system as set forth in claim 13, comprising;
at least two parallel groups of first-order control elements forming a group of second-order control elements to constitute a control level;
each of said microprogram control devices of said control groups having an equal number of input registers; said first groups of channels of said multichannel inputs of said input registers of said microprogram control devices being combined to form an instruction code input of said group of second-order control elements;
said second groups of channels of said multichannel inputs of said input registers of said microprogram control devices being combined to form the result status information input of said group of second-order control elements and connected to said communication line of said data exchange unit of said data processing device;
said data-in initiate signal inputs of said control units of said microprogram control devices being combined to form the data-in initiate input of said group of second-order control elements;
said data-in complete signal outputs of said control units of said microprogram control devices being combined to form the data-in complete signal output of said group of second-order control elements;
said multichannel outputs of said output driver units of said microprogram control devices being combined to form the multichannel output of said group of second-order control elements, which is coupled to said multichannel input of said microinstruction register of said data processing device;
said trigger outputs of said output driver units of said microprogram control devices being combined to form the trigger output of said group of second-order control elements, which is coupled to said trigger input of said internal operating cycle generator of said data processing device.

16. A microprogram control device as set forth in claim 13, comprising:
at least two sequential execution control levels,
at least one of said control levels being provided by a group of second-order control elements,
said group of second-order control elements incorporating at least two said microprogram control devices connected in parallel,
said sequential execution control levels being provided by serial connection of said groups of control elements,
each of said microprogram control devices of said groups of control elements incorporating an equal number of input registers,
said first groups of channels of said multichannel inputs of said input registers of said microprogram control devices of said group of second-order control elements being combined to form an instruction code input,
said second groups of channels of said multichannel inputs of said input registers of said microprogram control devices of said group of second-order control elements being combined to form a result status information input,
said data-in initiate signal inputs of said control units of said microprogram control devices of said group of second-order control elements are combined to form a data-in initiate signal input,
said data-in complete signal outputs of said control units of said microprogram control devices of said group of second-order control elements being combined to form a data-in complete signal output,
said multichannel outputs of said output driver units of said microprogram control devices of said group of second-order control elements being combined to form the multichannel output of said group of control elements,
said instruction code input of said group of control elements of a lower control level being connected to said multichannel output of said group of control elements of a higher control level,
said group of control elements of the lowest control level having said multichannel output being connected to said multichannel input of said microinstruction register of said data processing device and having said trigger output connected to said trigger input of said internal operating cycle generator of said data processing device,
said result status information inputs of said groups of control elements being combined to form a common input,
said first common input of said groups of control elements being connected to said communication line of said data exchange unit of said data processing device,
said trigger output of said group of control elements of a higher control level being connected to said first input of said first control unit of a subsequent lower control level.

17. A microprocessor computing system as set forth in claim 12, wherein a plurality of data processing devices are available, which operate in parallel to provide for the extension of the width of parallel-processed data, each data processing device further comprising:
a bit extension unit having a group of inputs and first and second outputs;
said arithmetic/logic unit having second and third inputs and second and third outputs;
said shifter having third and fourth inputs and a second output;
said result status register having an output;
a first input of said group of inputs of said bit extension unit, to accept signals from an external source, indicating the current state of said data processing device, a second input of said group of inputs of said bit extension unit coupled to said first output of said shifter, a third input of said group of inputs of said bit extension unit coupled to a respective output of said group of outputs of said microoperation decoder, a fourth input of said group of inputs of said bit extension unit coupled to said output of said result status register, a fifth input of said group of inputs of said bit extension unit coupled to said third output of said internal operating cycle generator, a sixth input of said group of inputs of said bit extension unit coupled to said fourth output of said internal operating cycle generator, a seventh input of said group of inputs of said bit extension unit coupled to said fifth output of said internal operating cycle generator, said first output of said bit extension unit being coupled to said third input of said shifter;

said arithmetic/logic units and said bit extension units of all said data processing devices being series-connected to form a closed loop;

said second and third outputs of said arithmetic/logic unit of each of said data processing devices being coupled, respectively, to eighth and ninth inputs of said group of inputs of said bit extension unit of each of said data processing devices;

said second output of said bit extension unit of one of said data processing devices, which generates a carry signal and a shift signal, being coupled to said fourth input of said shifter and to said second input of said arithmetic/logic unit of another one of said data processing devices;

said bit extension unit of one of said data processing devices being connected to said second output of said shifter and to said third input of said arithmetic/logic unit of another one of said data processing devices, to transfer a carry follow signal and a shift signal;

said trigger inputs of said internal operating cycle generators of all data processing devices being combined and connected to said trigger output of said group of first-order control elements;

said multichannel inputs of said microinstruction registers of all said data processing devices being combined and connected to said multichannel output of said group of first-order control elements;

all said data-processing devices incorporating an equal number of said data exchange units;

said communication lines of said first data exchange units of all data processing devices being combined and connected to said result status information input of said group of first-order control elements.

18. A microprocessor computing system as set forth in claim 17, wherein said data processing device further comprises:

at least one control unit having a group of inputs, a group of outputs, a first bus for holding data-in enable signals and data-out follow signals, and a second bus for holding data-in/data-out complete signals, said control units being equal in number to said data exchange units, first and second inputs of said group of inputs of said control unit connected to respective outputs of said microoperation decoder, a third input of said group of inputs of said control unit connected to said first output of said internal operating cycle generator, a fourth input of said group of inputs of said control unit connected to said fourth output of said internal operating cycle generator, a first output of said group of outputs of said control unit connected to a third input of said internal operating cycle generator;

said date exchange unit having first and second inputs, second and third outputs of said group of outputs of said control unit connected, respectively, to said first and second inputs of said respective data exchange unit.

19. A microprocessor computing system as set forth in claim 18, wherein said microprogram control device further comprises:

a utility register holding said microprogram control device transition condition codes and having an input, a multichannel input, and a group of outputs, said multichannel input of said utility register being coupled to a third multichannel output of said group of multichannel outputs of said microinstruction storage unit, said input of said utility register being coupled to a fourth output of said group of outputs of said internal operating cycle generator, a first output of said group of outputs of said utility register coupled to said first input of said output driver unit, a second output of said group of outputs of said utility register coupled to a second input of said group of inputs of said internal operating cycle generator, a third output of said group of outputs of said utility register coupled to a second input of said feedback register;

at least one control unit having a group of inputs and a group of outputs, said control units being equal in number to said input register, a first input of said group of inputs of said control unit to accept data-in initiate signals, a first output of said group of outputs of said control unit to generate data-in complete signals, a second input of said group of inputs of each control unit coupled to a fifth output of said group of outputs of said internal operating cycle generator, a third input of said group of inputs of said control unit coupled to a fourth output of said group of outputs of said utility register;

a second output of said group of outputs of said control unit coupled to said input of a respective input register and to a second input of said group of inputs of said internal operating cycle generator.

20. A microprocessor computing system as set forth in claim 19, comprising:

at least two said groups of first-order control elements connected in series to provide for a multi-level execution control so that sequential control levels are formed;

each of said microprogram control devices of said groups of first-order control elements comprising an equal number of said input registers;

said instruction code input of said group of first-order control elements of a lower control level being connected to said multichannel output of said group of first-order control elements of a higher control level;

said group of first-order control elements of the lowest control level having said multichannel output connected to said combined multichannel input of said data processing devices and said trigger output connected to said combined trigger input of said data processing devices;

said inputs to accept the result status information of said input registers of said groups of first-order control elements being combined to form a common input;

said first common input of said first input registers being connected to said common communication lines of said data processing devices;

said trigger output of said group of first-order control elements of a higher level being connected to said first input of said first control unit of said group of first-order control elements of a subsequent lower control level.

21. A microprocessor computing system as set forth in claim 19, comprising:
at least two parallel groups of first-order control elements forming a group of second-order control elements to constitute a control level;
each of said microprogram control devices of said control groups comprising an equal number of input registers;
said first groups of channels of said multichannel inputs of said input registers of said microprogram control devices being combined to form an instruction code input of said group of second-order control elements;
said second groups of channels of said multichannel inputs of said input registers of said microprogram control devices being combined to form the result status information input of said group of second-order control elements and connected to said communication line of said data exchange unit of said data processing devices;
said data-in initiate signal inputs of said control units of said microprogram control devices being combined to form the data-in initiate signal input of said group of second-order control elements;
said data-in complete signal outputs of said control units of said microprogram control devices being combined to form the data-in complete signal output of said group of second-order control elements;
said multichannel outputs of said output driver units of said microprogram control devices being combined to form the common multichannel output of said group of second-order control elements, which is coupled to said multichannel input of said microinstruction registers of said data-processing devices;
said trigger outputs of said output driver units of said microprogram control devices being combined to form the trigger output of said group of second-order control elements, which is coupled to the combined trigger input of said parallel data processing devices.

22. A microprocessor computing system as set forth in claim 19, comprising:
at least two sequential execution levels,
at least one of said control levels being provided by a group of second-order control elements,
said group of second-order control elements incorporating at least two said microprogram control devices connected in parallel,
said sequential execution control levels being provided by serial connection of said groups of control elements,
each of said microprogram control devices of said group of control elements incorporating an equal number of input registers;
said first groups of channels of said multichannel inputs of said input registers of said microprogram control devices of said group of second-order control elements being combined to form an instruction code,
said second groups of channels of said multichannel inputs of said input registers of said microprogram control devices of said group of second-order control elements being combined to form a result status information input,
said data-in initiate signal inputs of said control units of said microprogram control devices of said group of second-order control elements are combined to form a data-in initiate signal input,
said data-in complete signal outputs of said control units of said microprogram control devices of said group of second-order control elements being combined to form a data-in complete signal output,
said multichannel outputs of said output driver units of said microprogram control devices of said group of second-order control elements being combined to form the multichannel output of said group of control elements,
said instruction code input of said group of control elements of a lower control level being connected to said multichannel output of said group of control elements of a higher control level,
said group of control elements of the lowest control level having said multichannel output being connected to the combined multichannel input of said parallel data processing devices and having said trigger output connected to the combined trigger input of said parallel data processing devices,
said result status information inputs of said groups of control elements being combined to form a common input,
said first common input of said groups of control elements being connected to said communication line of said data-exchange unit of said data processing device,
said trigger output of said group of control elements of a higher control level being connected to said first input of said first control unit of a subsequent lower control level.

* * * * *